United States Patent [19]
Greschik

[11] Patent Number: 5,901,554
[45] Date of Patent: May 11, 1999

[54] EXPANSION ROTARY ENGINE

[76] Inventor: Gyula Greschik, 711 Lincoln Pl., Boulder, Colo. 80302

[21] Appl. No.: 08/646,125

[22] Filed: May 7, 1996

[51] Int. Cl.$^6$ ....................................................... F03G 7/00
[52] U.S. Cl. .............................................. 60/527; 60/528
[58] Field of Search .............................. 60/527, 528, 530

[56] References Cited

U.S. PATENT DOCUMENTS

| | | |
|---|---|---|
| 3,659,416 | 5/1972 | Brown ......................................... 60/530 |
| 4,281,513 | 8/1981 | Johnson et al. ............................ 60/527 |
| 4,938,026 | 7/1990 | Goldstein . |
| 4,979,365 | 12/1990 | Baker . |
| 4,996,842 | 3/1991 | Goldstein . |
| 5,033,865 | 7/1991 | Kuze . |
| 5,035,530 | 7/1991 | Fukuda et al. . |
| 5,052,181 | 10/1991 | Asada . |
| 5,172,551 | 12/1992 | Nakajima et al. . |
| 5,177,969 | 1/1993 | Schneider . |
| 5,222,362 | 6/1993 | Naus et al. . |
| 5,317,875 | 6/1994 | O'Brien et al. . |
| 5,335,498 | 8/1994 | Komatsu et al. . |
| 5,396,769 | 3/1995 | Brudnicki . |
| 5,419,133 | 5/1995 | Schneider . |

*Primary Examiner*—Noah P. Kamen
*Attorney, Agent, or Firm*—Rick Martin

[57] ABSTRACT

The present invention introduces two revolutionary concepts (a caterpillar and a squeeze engine) for rotary engines with features highly desirable for space applications, e.g., very high torque, light weight, low power AC or DC input, and smooth stroke over indefinite rotation. Through these unique advantages, the proposed concepts meet an existing demand in the space industry to which, so far, only very high cost and complex solutions have been developed. Although both concepts exploit the same physical phenomenon (the significant 15% volume change related to the paraffin solid-liquid phase change), their similarity stops here. They represent fundamentally different design philosophies and offer different performance characteristics. Preliminary calculations show that the caterpillar engine with no friction-prone slip contacts shall output an approximate 150 lbf—in torque for a 2 inch diameter and 0.5 inch deep cylindrical configuration while consuming approximately 20 W direct current. The corresponding time for one out put revolution might vary between half an hour and an hour depending on technical details. The second engine concept, the squeeze engine, if built with similar overall dimensions and power consumption as the caterpillar engine would produce approximately one ninth the output torque of the caterpillar engine with approximately nine times the speed. The output torque varies as the third power of the scaling of the configurations for both designs.

30 Claims, 17 Drawing Sheets

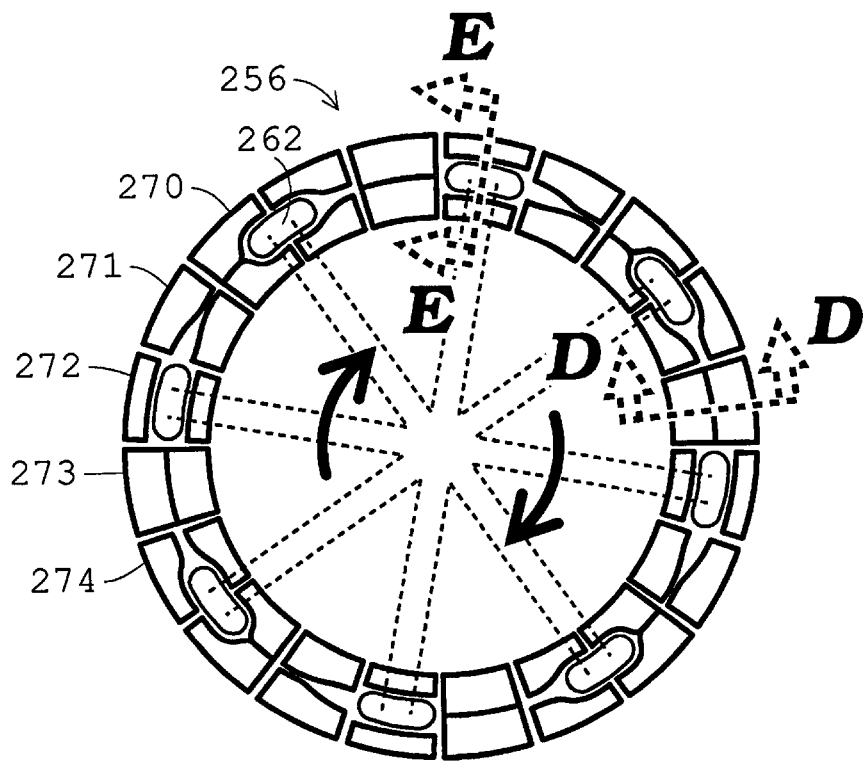
FIG. 34
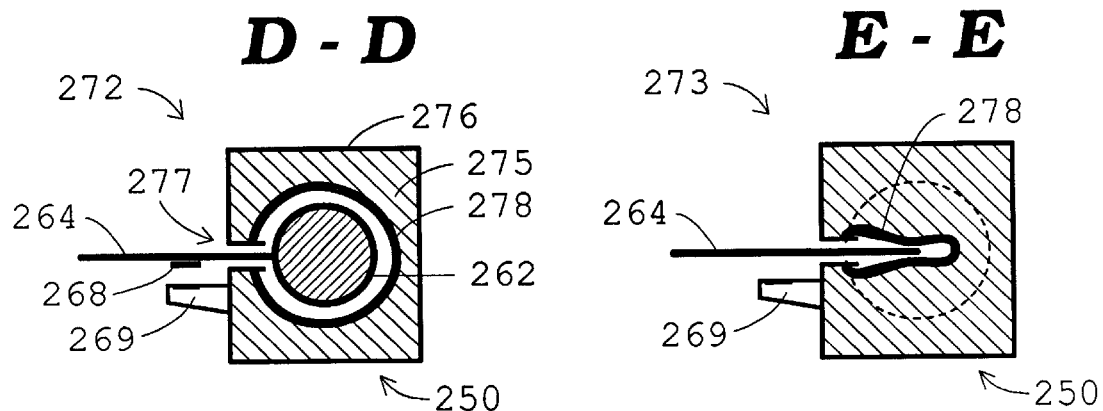
FIG. 35
FIG. 36

EXPANSION ROTARY ENGINE

FIELD OF INVENTION

The present invention relates to expansion rotary engines for aerospace applications. The engine achieves rotary motion using heat expansion of an expansive substance.

BACKGROUND OF THE INVENTION

Various thermal engines are known in the art. Some use shape memorizing alloys, some use thermo-chemical fluids, and some use the expansion of high purity paraffin.

Current devices powered by the melting of paraffin are based on the concept of a paraffin actuator. These devices are referred to as linear paraffin engines. These devices involve a high purity paraffin-filled space enclosed in a cylinder into which an actuator rod is placed. If the paraffin is melted, then its corresponding high volume expansion factor of 15% forces the actuator rod to emerge from the cylinder. Actuation can be active or passive. In the former case, the paraffin is melted by heating filaments. Passive actuation, on the other hand, is triggered by an environmental temperature increase. The desired response temperature is selected via the use of the proper type of paraffin.

Benefits for aerospace applications include the following:

high reliability due to utmost mechanical simplicity light weight (typically 2 ounces)

low power consumption (typically 10 W)

high output force (50–1000 lbf)

operable with AC or DC Power high kick-off force gentle, smooth stroke resetability high cycle life precision long stroke capability wide range of actuation temperatures according to type of paraffin used option for magnetic cleanliness A shortcoming of the paraffin actuator is its limited stroke, which can be extended only at the cost of the actuator size. Consequently, linear actuators find their best applications in release mechanisms and latches. Their use to power a wide range of rotary or linear motion would entail a loss of power due to the complexity of gears involved. Certain operations, however, require a steady, strong force sustained over a considerable extent of motion. An example is drum rotation during the deployment or retraction of unfurlable structures. Also, space structure deployment often involves relative rotations over large, often obtuse angles. The deployment of these structures could be designed along novel lines if such rotations could be directly powered without the weight and power consumption penalties of conventional electric engines.

The rotary paraffin engine concept described by the present invention has been developed to, first, overcome the stroke limitations of paraffin actuators without a decrease of output power. Second, the present invention offers an alternative to existing rotary actuation technology by directly powering rotary, rather than linear, motion. Therefore, it permits the reactivation of the advantages listed above for actuation.

SUMMARY OF THE INVENTION

The Caterpillar Engine

The main object of the present invention is to provide an engine which utilizes the caterpillar motion of a number of sections—linearly arranged identical engine units—to output continuous linear or rotary motion.

Another object of the present invention is to place the caterpillar engine's sections linearly arranged either along a straight or a curved path of constant or varying length or along a closed curve.

Another object of the present invention is to provide a caterpillar engine where the caterpillaring of the sections is powered by electrical, thermo-electrical, chemical, mechanical, or other means.

Another object of the present invention is to provide a caterpillar engine where the caterpillaring sections are driven by one or more full caterpillar heat waves. The caterpillar heat waves are regions of relative high temperature within the engine that can move along the series of sections.

Another object of the present invention is to provide a caterpillar engine which involves a caterpillar gear that is connected to all or some of the engine's caterpillaring sections to transform their caterpillar motion into the continuous relative motion of the rotor and stator.

Another object of the present invention is to provide a caterpillar engine where the engine sections driven into continuous caterpillar motion move along the (closed or open) trajectory of the sequence of caterpillaring sections for at least a part of that trajectory.

Another object of the present invention is to provide a caterpillar engine where the powering of the caterpillar motion of the sequence of sections is controlled by a mechanical and/or electrical and/or thermal feedback from the instantaneous configuration of the sections.

Another object of the present invention is to provide a caterpillar engine where the feedback mechanism involves the caterpillar gear.

Another object of the present invention is to provide an electric engine which utilizes thermal expansion to produce rotary or linear motion.

Another object of the present invention is to provide a thermoelectric rotary engine which involves a number of sections linearly arranged along a circle.

Another object of the present invention is to provide a thermoelectric rotary engine where each of the linearly arranged sections includes an expandable chamber filled with a material (such as paraffin) the thermal expansion of which is exploited.

Another object of the present invention is to provide a thermoelectric rotary engine where chamber expansion is inhibited lateral to the direction of the sequence of sections by the application of a chamber wall of globally nonisotropic stiffness (such as the wall of an accordion tube) or by external or internal support, or by other means.

Another object of the present invention is to provide a thermoelectric rotary engine where the adjacent sections are separated by elements referred to as diaphragms. The elements can be planar or of other shapes.

Another object of the present invention is to provide a thermoelectric rotary engine where one or both faces of the diaphragms toward the adjacent sections is partially or fully coated with a heat conductive layer.

Another object of the present invention is to provide a thermoelectric rotary engine where the individual sections or their contents can be directly or indirectly heated and/or cooled, e.g. with embedded filaments; heat transfer devices such as Peltier heat pumps; etc. Also, heat can be exchanged between sections.

Another object of the present invention is to provide a thermoelectric rotary engine where the heating and/or cooling of the sections or their contents are aided or substituted for by non-electrical means such as radiation or convective heating or cooling through engine parts or via a liquid or gas medium, if present.

Another object of the present invention is to provide a thermoelectric rotary engine where the diaphragms can have printed circuits on their surfaces.

Another object of the present invention is to provide a thermoelectric rotary engine where electric components for the heating and/or cooling of the sections or their contents are repetitively wired into circuits.

Another object of the present invention is to provide a thermoelectric rotary engine where the temperature control of the sections is aided by the power transmission mechanism, referred to herein as the caterpillar gear.

Another object of the present invention is to provide a thermoelectric rotary engine where the circuitry is etched or affixed to the diaphragm surfaces and/or to chamber walls.

Another object of the present invention is to provide a thermoelectric rotary engine where the circuitry includes temperature, pressure, strain, position, relative position, electromotive force sensitive elements, or elements capable of time-delayed response.

Another object of the present invention is to provide a thermoelectric rotary engine in which a phase-delay between some or all of the caterpillar waves involved is present.

Another object of the present invention is to provide a thermoelectric rotary engine which is connected to other similar thermoelectric rotary engines directly or via planetary mechanism to form a compound engine.

Another object of the present invention is to provide:
 a temperature and motion control logic external to the engine mechanism.
 a section that is a mechanically self contained removable entity.

The Caterpillar Gear

Another object of the present invention is to provide a gear mechanism to transform the linear caterpillar motion of a number of sections into the continuous linear relative motion between the rotor and stator via mechanical means.

Another object of the present invention is to provide a caterpillar gear where the caterpillaring sections are linearly arranged either along a straight or a curved path of constant or varying length or along a closed curve.

Another object of the present invention is to provide a caterpillar gear which involves transmission bars that directly move the rotor and stator by locking to one or to the other or to neither one of them, depending on the phase of motion.

Another object of the present invention is to provide a caterpillar gear of the above elements where each transmission bar corresponds to a pair of adjacent caterpillaring diaphragms.

Another object of the present invention is to provide a caterpillar gear where the position of each bar locking to and unlocking from either of the rotor and stator is governed by the distance between the pair of diaphragms to which the transmission bar corresponds.

Another object of the present invention is to provide a caterpillar gear where each transmission bar is connected to its corresponding diaphragms with connection elements such that the change of distance between the two diaphragms results in a motion of the transmission bar lateral with respect to the direction of the caterpillar motion.

Another object of the present invention is to provide a caterpillar gear where the lateral motion of the transmission bar directly makes the transmission bar lock to or disconnect from the rotor or the stator.

Another object of the present invention is to provide a caterpillar gear where the locking of the transmission bar to the stator or the rotor is realized by friction or by other mechanical means such as gear teeth.

Another object of the present invention is to provide a caterpillar gear where the transmission bar locks into teeth on the rotor and stator with a tooth geometry which allows the smooth engagement and disengagement of the connection despite the coupled longitudinal and transverse motion of the transmission bar.

The Caterpillar Engine and Gear

The preferred embodiment of the present invention is an engine with a rotor and a stator. Enclosed in the rotor and stator is a chamber. The chamber is composed of sections. The sections are made up of accordion tubes filled with an expansive substance and separated by diaphragms. For brevity, the expansive substance is referred to in the following as paraffin. The diaphragms are connected to one another via a caterpillar gear. The caterpillar gear is comprised of a transmission bar connected to the diaphragms by a spring or levers. The transmission bar as a functional element may reduce to the joint between the levers. The transmission bar is connected to the rotor or stator when the paraffin is melted or frozen. The transmission bar is not connected to the rotor or stator when the paraffin is expanding or contracting. The state of the paraffin is controlled by heat waves which are rotating around the engine. The heat waves are generated by heaters and/or coolers for the sections. The timing for the heat waves can be controlled by external means or by the contact of the transmission bars with the rotor and stator.

The Squeeze Paraffin Rotary Engine

The main object of the alternate embodiment of the engine is to provide a squeeze rotary engine which utilizes the method of squeezing multiple actuator rods from squeeze tubes and letting them enter the tubes on the other side. The multiple actuator rods are mounted on the rotor of the squeeze rotary engine.

Another object of the alternate embodiment of the engine is to provide doors, either conical, slanted, or sliding, between the squeeze boots to allow the passage of the actuator rods. The doors do not interfere with the expansion and contraction of the squeeze boots which takes effect independent of adjacent squeeze boots. The doors confine the expanding squeeze boots in their respective squeeze boots.

Another object of the alternate embodiment of the engine is to provide an electrical, mechanical, chemical, or thermal method to generate heat waves.

Another object of the alternate embodiment of the engine is to:
 include a circular disk (the rotor disk) into the rotor, or the circumference of which the actuator bars are mounted.
 provide a slit on the sides of the squeeze tube and boots facing the engine axis for the rotor disk to pass.
 aid section cooling in a ribs or the outside of the stator.

Other objects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 34 is a top cross-sectional diagrammatic view of the squeeze paraffin rotary engine of FIG. 32.

FIG. 35 is a vertical cross-sectional view 4—4 of a solid section of the squeeze paraffin rotary engine of FIG. 34 with the actuator rod within.

FIG. 36 is a vertical cross-sectional view 5—5 of a melted section of the squeeze paraffin rotary engine of FIG. 34.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
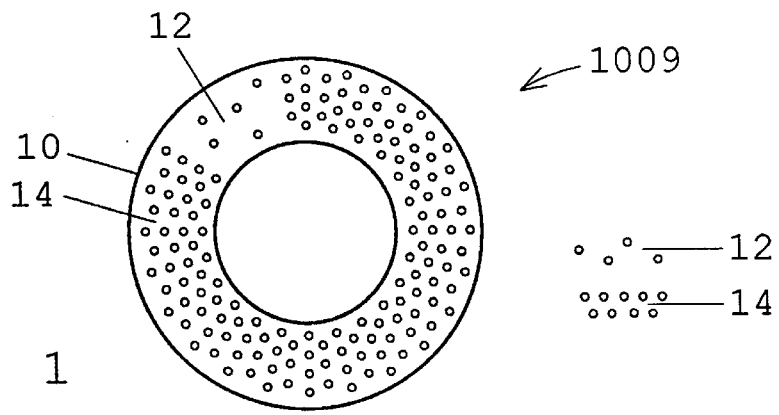
FIG. 1 is a diagrammatic view of one step of caterpillar motion of paraffin in a toroidal space.
Figure 2:
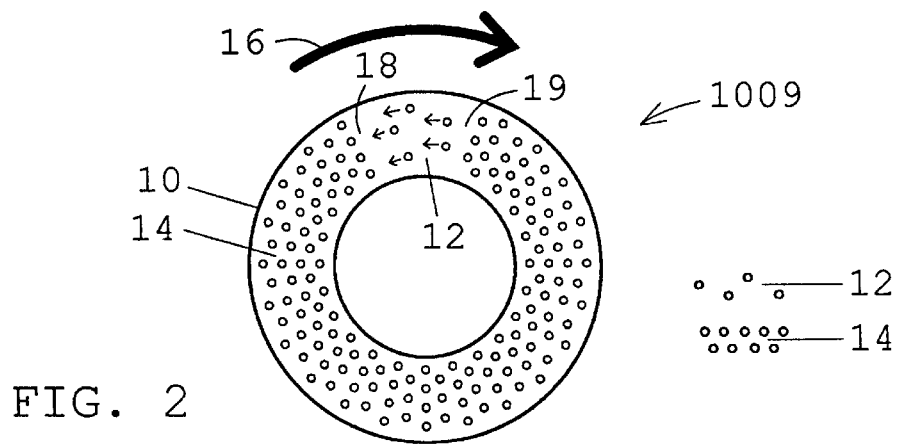
FIG. 2 is a diagrammatic view of the second step of caterpillar motion of paraffin in a toroidal space. A heat wave is driving the caterpillar motion.
Figure 3:
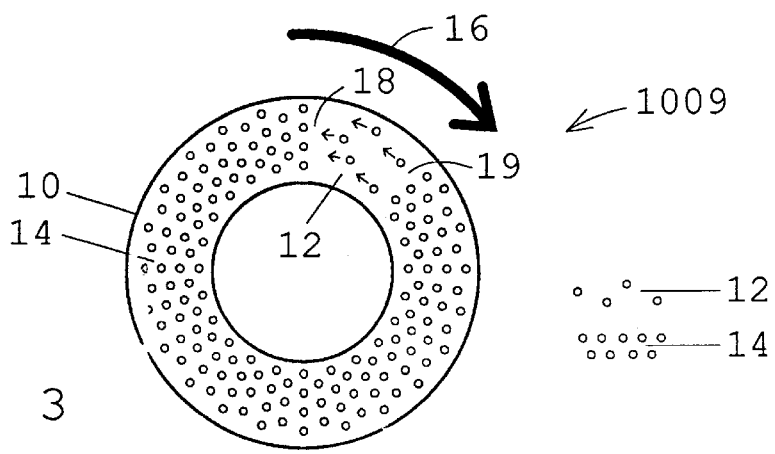
FIG. 3 is a diagrammatic view of the third step of caterpillar motion of paraffin in a toroidal space. A heat wave is driving the caterpillar motion.

FIGS. 1–3 illustrate the fundamental concept of caterpillar motion of particles of an expansive substance in a toroidal chamber 10.

A toroidal space 1009 is constructed from the toroidal chamber 10 filled with frozen paraffin 14 throughout except in one section, zone 12, where the paraffin is molten.

A revolving heat wave 16 is applied to the toroidal chamber 10. At the rear of the molten zone 18 the paraffin precipitates and thus shrinks. At the front of the molten zone 19 the paraffin expands due to the advance of the revolving heat wave 16. Thus, the paraffin particles in the molten zone 12 move counter to the movement of the heat wave 16.

Figure 4:
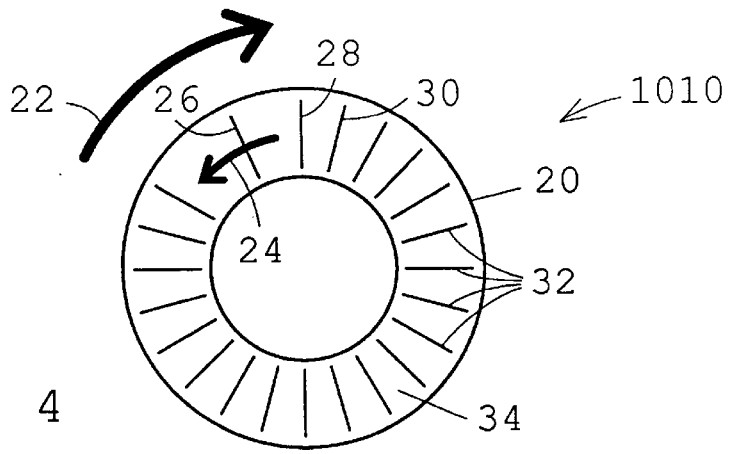
FIG. 4 is a diagrammatic view of step one of the caterpillar motion of paraffin in a toroidal space. A heat wave is driving the caterpillar motion, and diaphragms are embedded in the paraffin.
Figure 5:
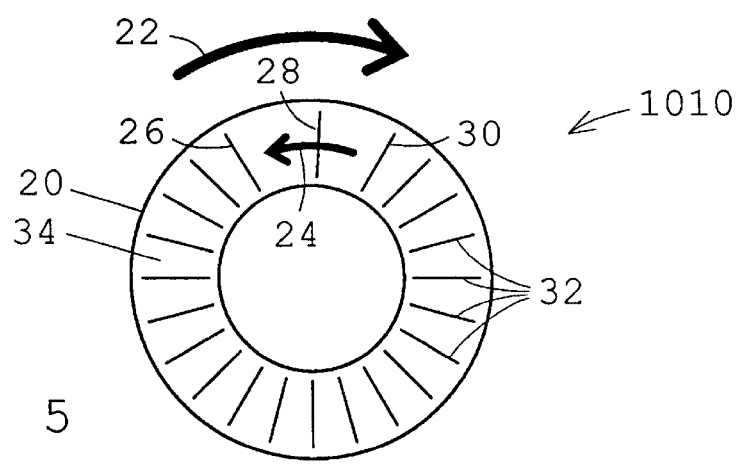
FIG. 5 is a diagrammatic view of step two of the caterpillar motion of paraffin in a toroidal space. A heat wave is driving the caterpillar motion, and diaphragms are embedded in the paraffin.
Figure 6:
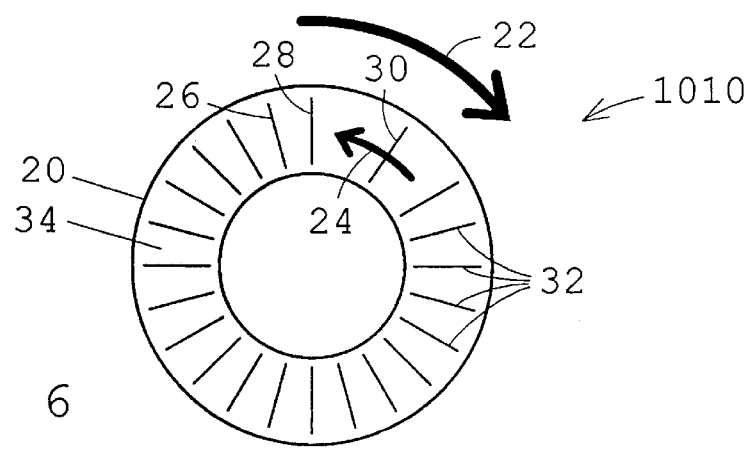
FIG. 6 is a diagrammatic view of step three of the caterpillar motion of paraffin in a toroidal space. A heat wave is driving the caterpillar motion, and diaphragms are embedded in the paraffin.

FIGS. 4, 5, and 6 depict a similar toroidal configuration 1010 to configuration 1009 of FIGS. 1, 2, and 3 except that diaphragms 32 have been placed in the toroidal chamber 20. The toroidal chamber 20 is filled with paraffin 34. As a heat wave 22 moves around the toroidal chamber 20 the diaphragms 32 move around the inside of the toroidal chamber 20. Diaphragms 26, 28, and 30 illustrate the caterpillar like motion in direction 24 which is counter to the motion of the heat wave 22.

Figure 7:
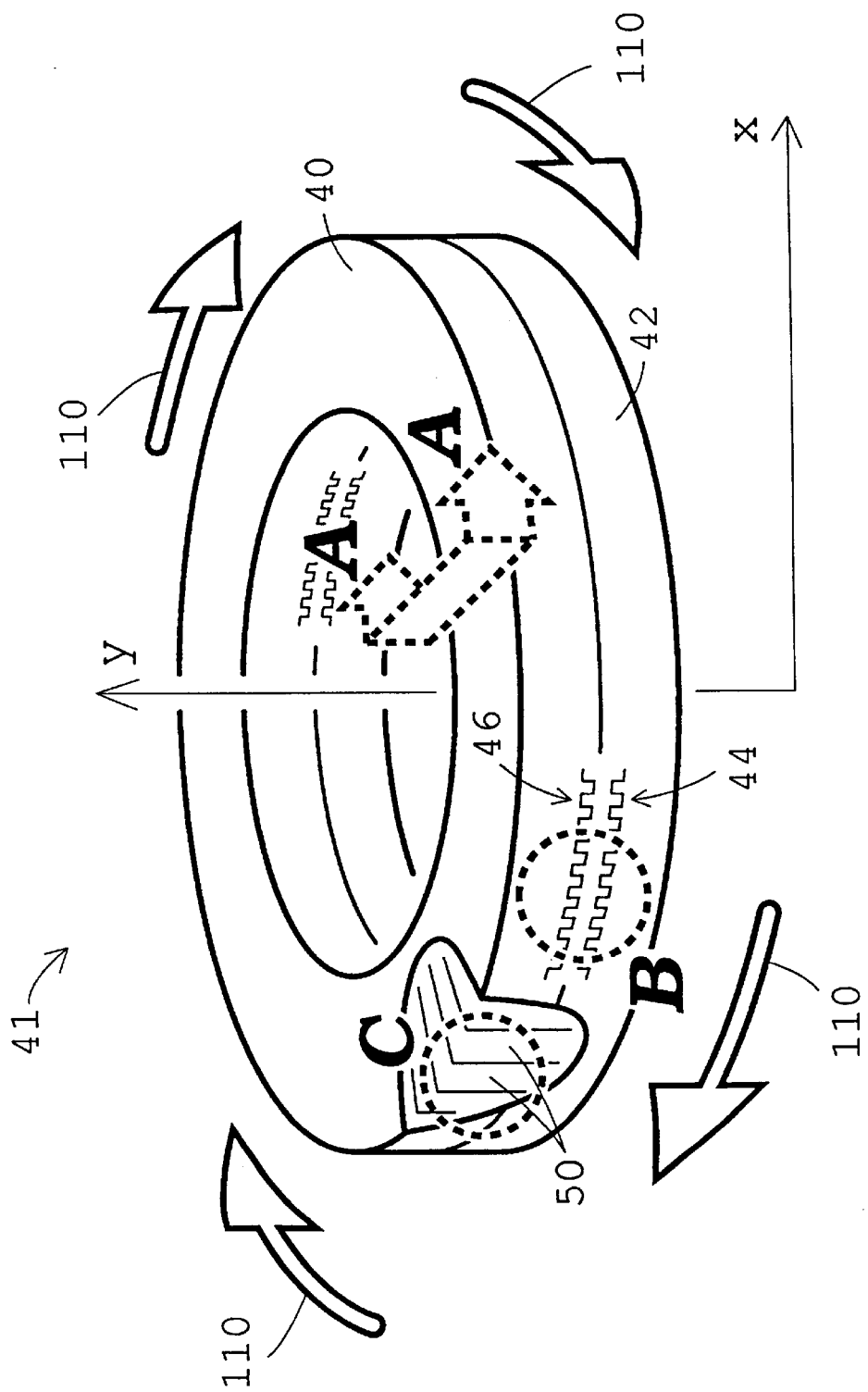
FIG. 7 is a perspective view of a paraffin rotary engine.
Figure 8:
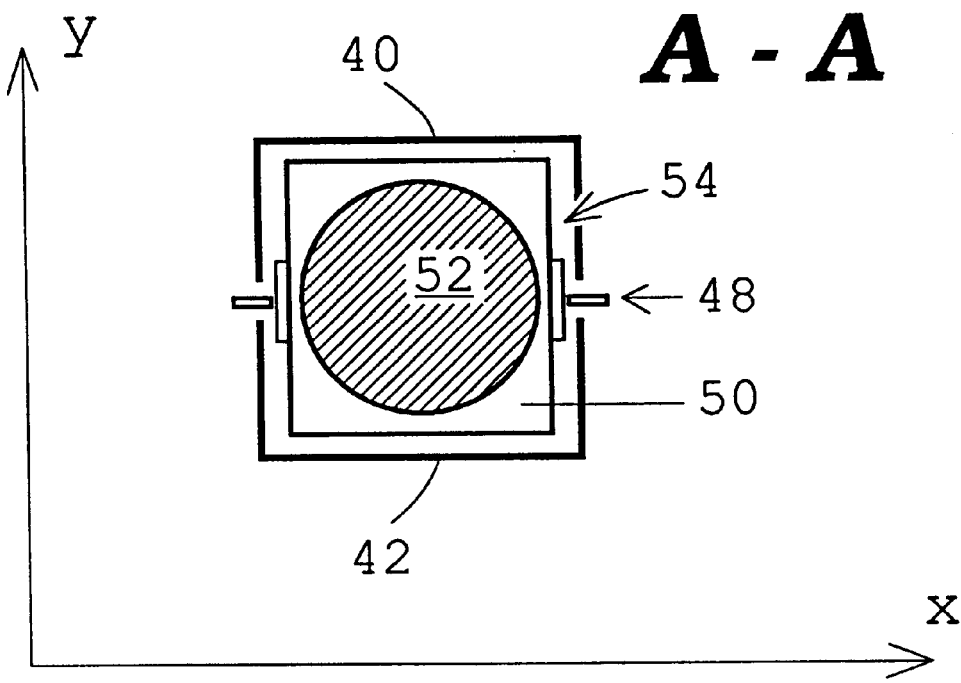
FIG. 8 is a cross sectional view of the paraffin rotary engine of FIG. 7 taken along line 1—1.

FIGS. 7 and 8 show the preferred embodiment of the paraffin rotary engine 41. The paraffin rotary engine 41 is based on the exploitation of the caterpillar motion described in FIGS. 4, 5, and 6. The paraffin rotary engine 41 has a rotor 40, and a stator 42 which enclose the engine core 54. The chamber 52, the diaphragms 50, the gear mechanism 48, and the heating and cooling circuitry (not shown) constitute the core 54 of the paraffin rotary engine 41. The rotor 40 and the stator 42 have gear teeth 46 and 44 respectively to engage the gear mechanism 48. To increase the paraffin rotary engine's 41 power output and to achieve a balanced torque on the stator 42 and rotor 40, a number of heat waves 1012 can be used concurrently. The heat waves 1012 are synchronized. The synchronization is either automatic and mechanically achieved by the gear mechanism, or it is enforced by external temperature control of the sections. The synchronization of the heat waves will be discussed later.

Figure 9:
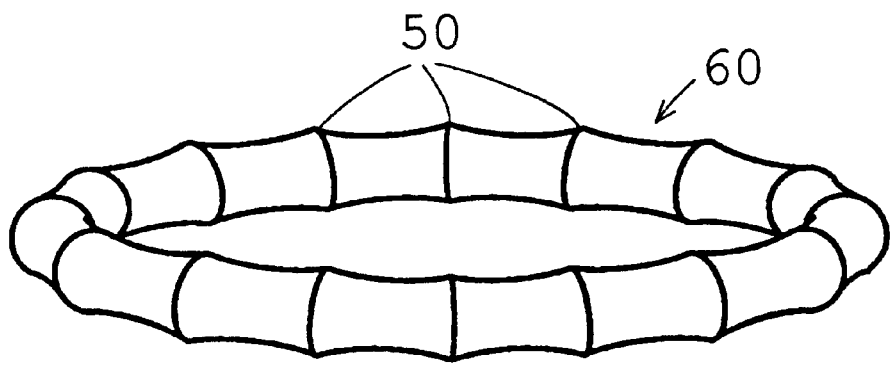
FIG. 9 is a perspective diagrammatic view of a chamber of a paraffin rotary engine divided into sections.

As alluded to in FIGS. 4, 5, and 6, the caterpillar motion of the paraffin is exploited via a number of intersection elements, herein referred to as diaphragms 50. In the preferred embodiment, the diaphragms are flat plates. They, however, could be shaped otherwise in other embodiments. The diaphragms are not merely embedded in the paraffin but, rather they separate sections of the chamber 52. As shown in FIG. 9, the chamber 52 can be thought of as looking like a bicycle innertube with tightly placed diaphragms 50 subdividing the space within.

Figure 10:
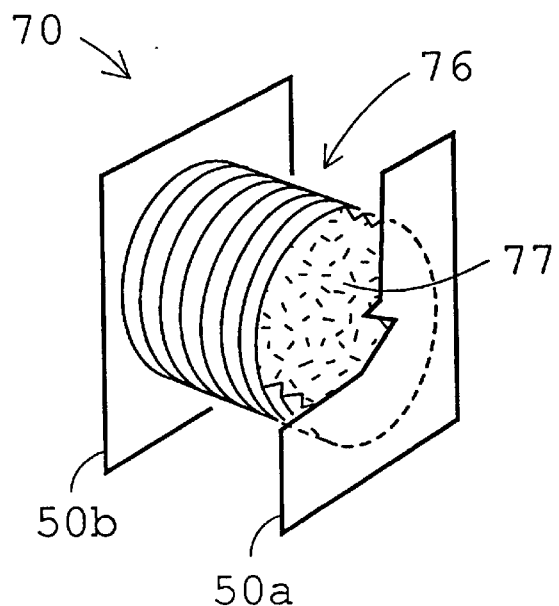
FIG. 10 is a perspective view of a section of the chamber of the a paraffin rotary engine of FIG. 7.
Figure 11:
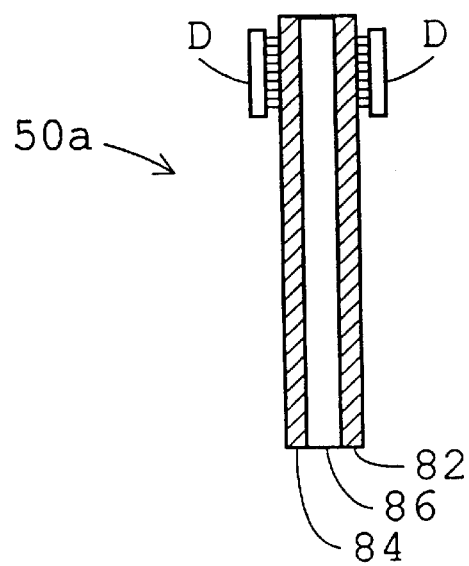
FIG. 11 is a cross sectional view of a diaphragm of the paraffin rotary engine of FIG. 7.
Figure 12:
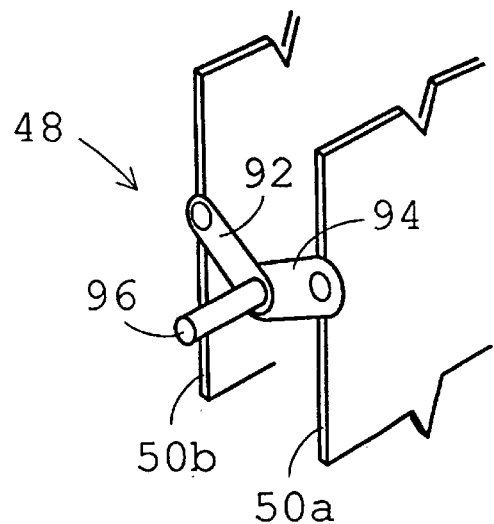
FIG. 12 is a perspective view of a caterpillar gear connecting two of the diaphragms in the paraffin rotary engine of FIG. 7.

FIG. 10 is a section 70 of the chamber 52 of FIG. 8 but also includes diaphragms 50a and 50b. The section 70 is accordion tube 76 enclosed unit between two of the diaphragms 50 represented as diaphragms 50a and 50b. This accordion tube enclosed unit is sealed at both ends and is removable from between the diaphragms. The accordion tube 76 is filled with paraffin 77. The accordion tube 76 has a high radial and a low axial stiffness. This is essential to transmit the energy of the expansion into the movement of the diaphragms 50a and 50b. FIG. 11 shows a cross section of one of the diaphragms 50a. The chamber 52 sections are melted and frozen independently to achieve the circulation of the heat wave 110. To permit the sections' independent temperature control the diaphragm 50a has an insulating lamina 86. To assist in the removal of heat the diaphragm 50a can also have convective laminae 82 and 84.

The protruding diaphragm 50 edges serve a number of purposes:

They keep the accordion tube 76 from rubbing against the rotor 40 and stator 42.

They are used to connect the gear actuator 48.

They offer surfaces for the attachment of circuitry 140.

The Caterpillar Gear

Referring now to FIGS. 7, 8, 10, 12 to transform the caterpillar motion into a continuous movement of the rotor 40 with respect to the stator 42, a gear mechanism 48 should: connect each fully expanded section 70 to the rotor 40; connect each fully contracted section 70 to the stator 42; and disconnect sections 70 under either expansion or contraction from either the rotor 40 or stator 42. These can be achieved by making the section 70 size itself govern the section's 70 connection to the rotor 40 and stator 42 via the gear mechanism 48 illustrated in FIG. 12.

The diaphragms 50a and 50b of section 70 are connected to each other via a two bar linkage consisting of levers 92 and 94. A transmission bar 96 is mounted at the intersection of the two levers 92, 94. A change of distance between the two diaphragms 72, 74 will raise or lower the transmission bar 96. The length of the levers 92, 94 can be designed to transform slight expansion or contraction of section 70 into amplified vertical motion of the transmission bar 96. The gear mechanism 48 of FIG. 8 is comprised of the diaphragms 50a, 50b, the levers 92, 94 and the transmission bar 96.

Figure 13:
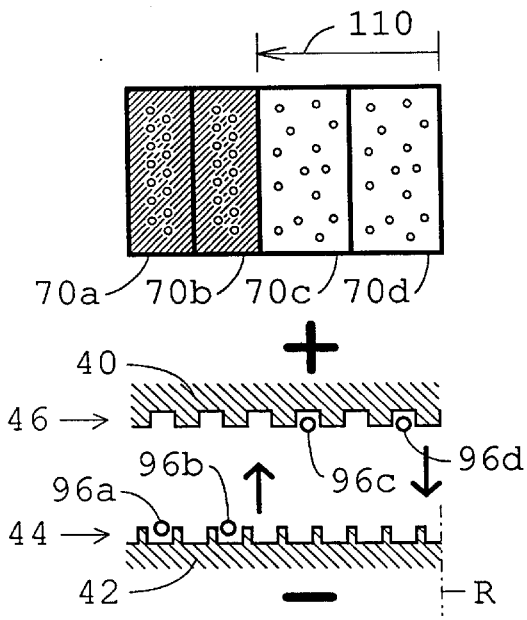
FIG. 13 is a cross sectional schematic of the first phase of a step of caterpillar motion. The locations of the transmission bars for each section are depicted.
Figure 14:
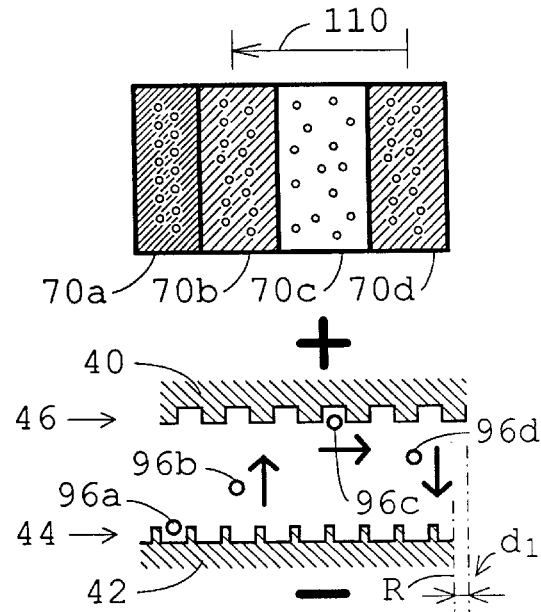
FIG. 14 is a cross sectional schematic of the second phase of a step of caterpillar motion. The locations of the transmission bars for each section are depicted.
Figure 15:
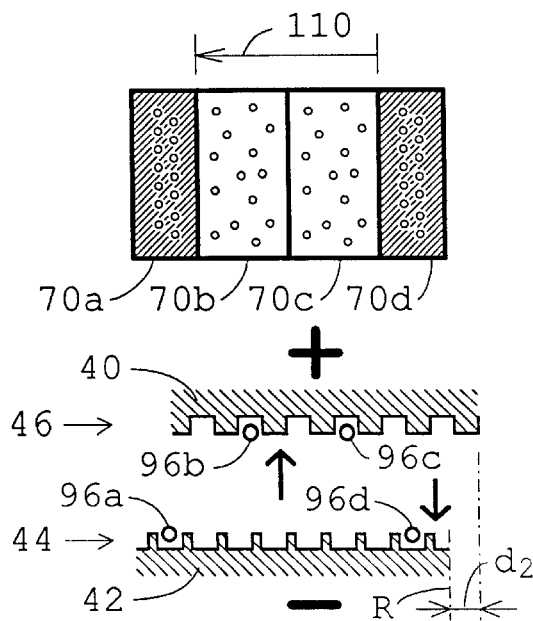
FIG. 15 is a cross sectional schematic of the third phase of a step of caterpillar motion. The locations of the transmission bars for each section are depicted.

Subsequent phases of one step of caterpillar motion is shown in FIGS. 13, 14, and 15. Sections 70 represented by section 70a–70d are illustrated with their transmission bars 96a to 96d. The rotor and stator gear teeth 46 and 44 are also shown symbolically. In FIG. 13 sections 70a and 70b are fully contracted. The associated transmission bars 96a and 96b are locked in the stator gear teeth 44. Sections 70c and 70d are fully expanded and the associated transmission bars 96c and 96d are locked in the rotor gear teeth 46. As heat wave 110 moves from right to left, section 70b moves from fully contracted to fully expanded. Transmission bar 96b moves from locked to the stator gear teeth 44 (FIG. 13), to not locked at all (FIG. 14), to locked to the rotor gear teeth 46 (FIG. 15). Section 70d and transmission bar 96d go through the opposite transition.

As section 70b expands, transmission bar 96a, which is locked to the stator teeth 44, remains stationary. Section 70c along with its transmission bar 96c is pushed to the right. Since transmission bar 96c is locked to the rotor teeth 46 they are also pushed to the right. This movement with respect to reference line R is shown as di (FIG. 14) and d2 (FIG. 15).

Figure 16:
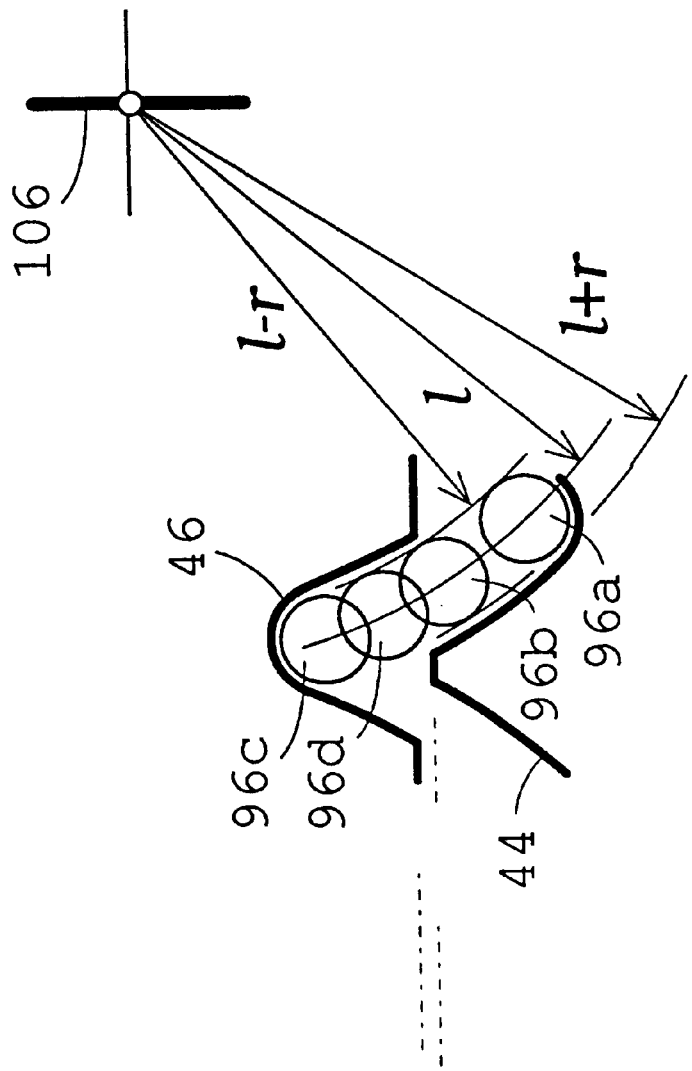
FIG. 16 is view 2 of the rotor and stator teeth of the paraffin rotary engine shown in FIG. 7.

FIG. 16 depicting view 2 of FIG. 7 is the actual shape of the rotor and stator gear teeth 46, 44.

Figure 17:
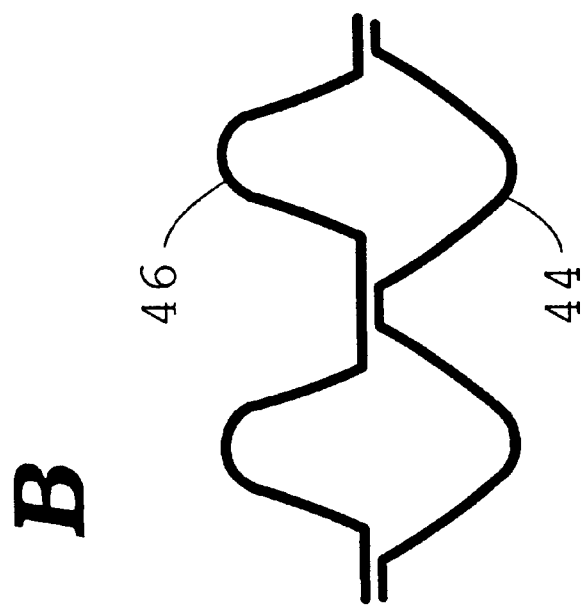
FIG. 17 is the view of the geometry between the diaphragm, the transmission bars, the rotor teeth, and the stator teeth in the paraffin rotary engine of FIG. 7.

FIG. 17 shows the design geometry for the rotor and stator teeth 46, 44. The length of a lever connected to a diaphragm 50 is shown as L, and the radius of a transmission bar 96 is r. The locations of transmission bars 96a to 96d are in the locations represented by FIG. 14. The transmission bar 96c is locked to the rotor teeth 46. This position belongs to the fully expanded state of the section that corresponds to the transmission bar. The transmission bar 96 a is locked to the stator teeth 44. This position belongs to the fully contracted state of the section that corresponds to the transmission bar. Transmission bars 96b and 96d are not locked to either gear teeth 44 or 46.

Figure 18:
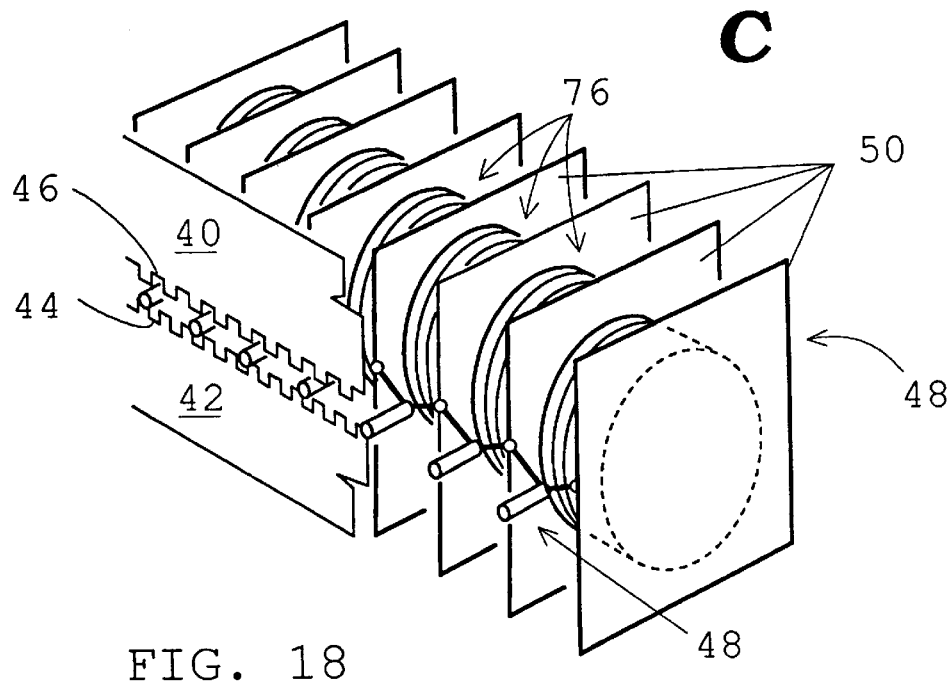
FIG. 18 is perspective schematic view 3 of the mechanical relationship between the diaphragms, caterpillar gear, rotor and stator of the paraffin rotary engine of FIG. 7.

FIG. 18 illustrates an internal section 3 of the paraffin rotary engine 41 shown in FIG. 7. The gear mechanisms 48 are located on the outer and inner edges of the diaphragms 50. The rotor and stator gear teeth 46, 44 are also on the inner and outer edges of the rotor 40 and stator 42.

Figure 19:
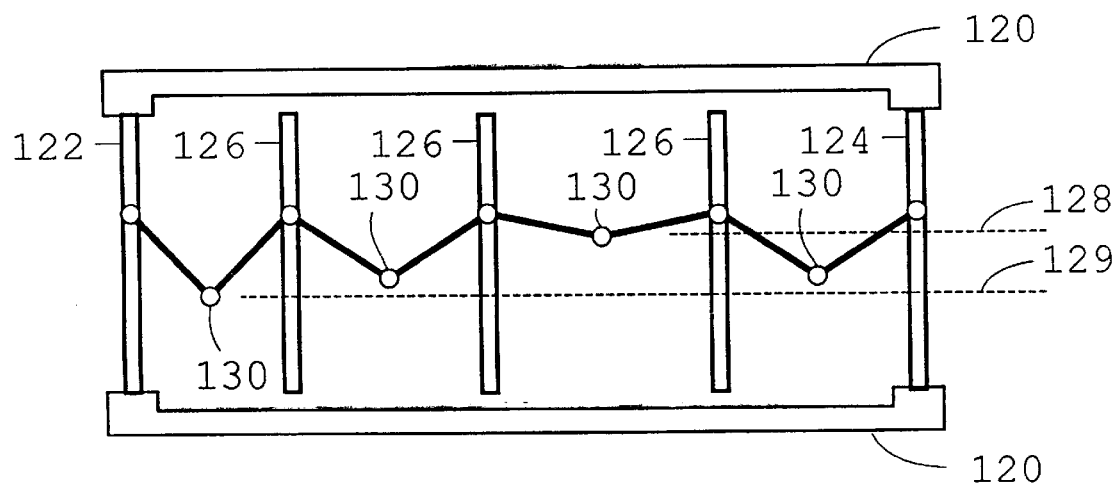
FIG. 19 is a cross sectional diagrammatic view of the diaphragms and caterpillar gear of a paraffin linear actuator.

The configuration depicted in FIGS. 13, 14, and 15 contains the minimum number of sections that still permit the gear mechanism to function as intended. This set of sections is, therefore, referred to as the minimum cell of the caterpillar kinematics. As shown in FIGS. 13, 14, and 15 the expansion of one section of the minimum cell is compensated by the contraction of another. Thus, the length of the minimum cell is constant. This kinematic feature is enforced by the infinite (e.g., circular) repetition of the unit cell. If, however, the constant length is enforced without an infinite repetition, such as via a coupler 120 between the first and the last diaphragms 122 and 124 of the cell as shown in FIG. 19, The kinematics still remains functional. The configuration shown in FIG. 19, therefore, is a finite version of the caterpillar gear. Diaphragms 126 and 124 are moved by paraffin expansion and contraction as previously discussed. When transmission bars 130 are at line 128 they are locked to a rotor (not shown). When transmission bars 130 are at line 129 they are locked to a stator (not shown). The caterpillar gear, including the gear teeth shape design, has been demonstrated on a working model.

Section Heating and Cooling

Assuming that the paraffin freezes at the temperature of the environment, three operations of temperature control need to be repeated for each section:

1. melting (at the front of the heat wave);
2. sustaining high temperature (within melted zone); and
3. cooling (at the end of the heat wave).

Each step of caterpillar motion entails the above three operations performed on different sections sequentially.

FIGS. 13, 14, and 15 show the phases of one step of caterpillar motion along with the locations of the transmission bars 96a to 96d. Note that throughout the steps depicted, the two transmission bars 96a, 96c which enclose the section 70b being melted, are locked into stator and rotor gear teeth 44, 46. A circuit, (to be discussed in FIGS. 20–22) with heating and cooling elements, is closed through the transmission bars 96.

Figure 20:
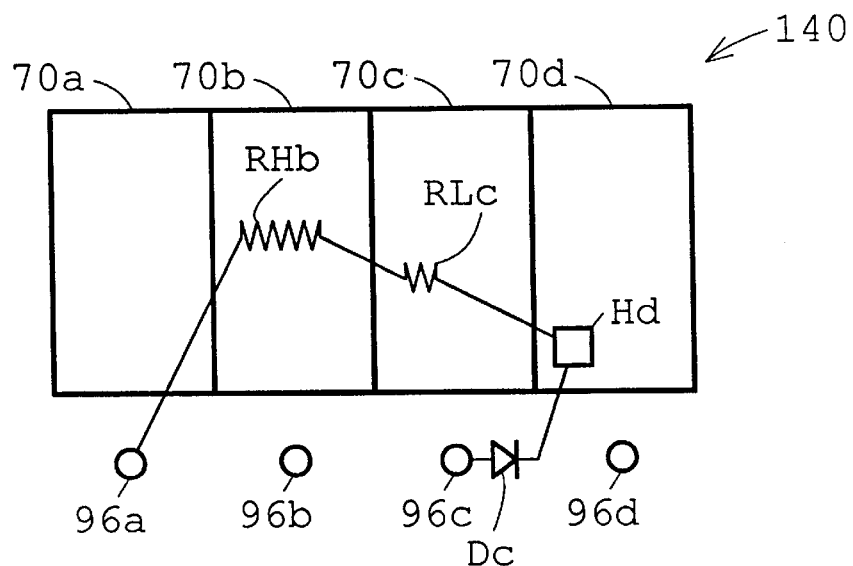
FIG. 20 is a schematic view of one unit of a step drive circuit for the paraffin rotary engine of FIG. 7. The components of the circuit external to the paraffin filled space are shown on the diaphragm in FIG. 11 as an integrated circuit unit.

FIG. 20 is a circuit 140 to drive the step depicted in FIGS. 13, 14, and 15. The rotor 40 is at a positive voltage with respect to the stator 42. Transmission bars 96a and 96c are connected to the rotor 40 and stator 42 as previously described. The high capacity heater RHb will melt the paraffin in section 70b. The low capacity heater RLc will sustain the high temperature in expanded section 70c. The Peltier heat sink Hd will cool section 70d. In subsequent steps this circuit will be disconnected from the rotor 40 and stator 42 due to the fact that when the next step starts, transmission bars 96a and 96c both connect to the rotor 40, the stator 42, or at least one is disconnected.

The voltage polarity applied to the circuit can be reversed if the transmission bar 96a is connected to the rotor 40 and the transmission bar 96c is connected to the stator 42. When this happens, diode Dc is used to deactivate the circuit 140.

Figure 21:
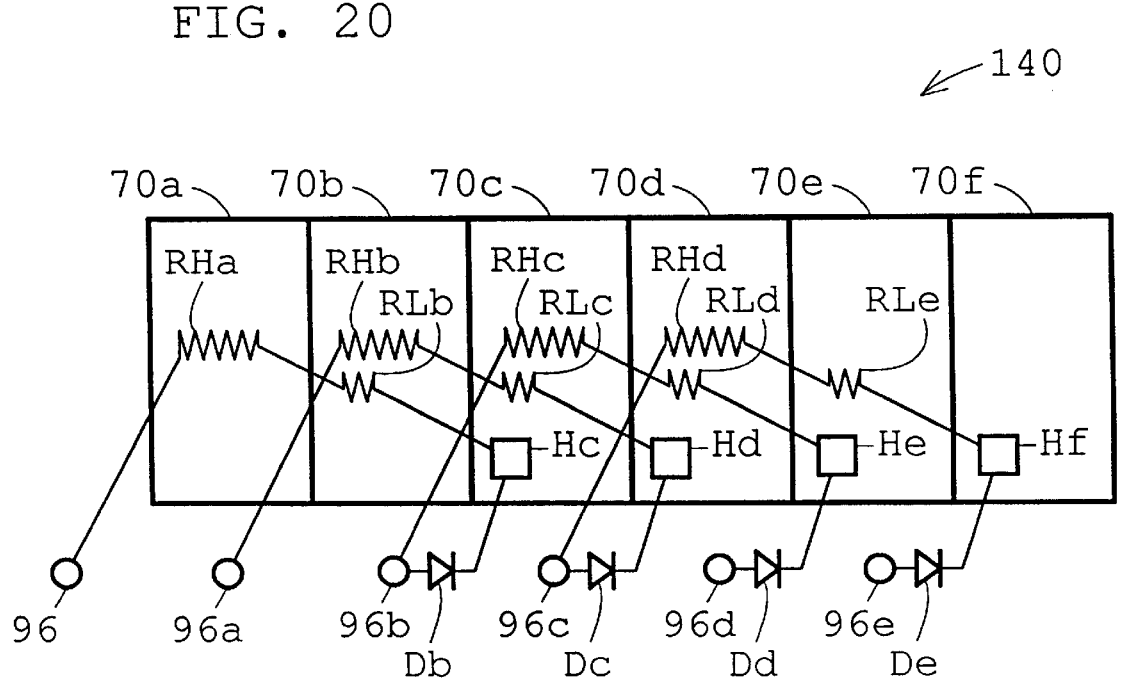
FIG. 21 is a diagrammatic schematic view of a step drive circuit for one direction of steps.

FIG. 21 is the circuit of FIG. 20 expanded to adjacent sections 70a to 70f.

Figure 22:
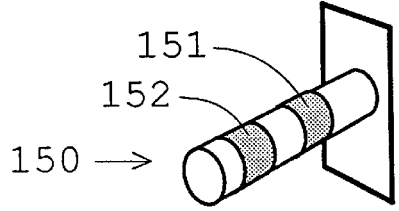
FIG. 22 is a perspective view of a transmission bar with contact surfaces for forward and reverse step drive circuits.

Another set of similar circuits may be implemented symmetrically for reverse motion. FIG. 22 shows a transmission bar 150 with separate contact surfaces 151, 152 for forward and reverse circuits. Contact circuits for the reverse circuitry would also be on the rotor and stator teeth 46 and 44.

The heating and cooling elements of the step drive circuit 140 are embedded in the paraffin. Other circuit elements such as connections and the diode D (control) are attached to the diaphragm 50 as shown in FIG. 11.

The step drive circuit 140 of FIG. 20 is by no means the only implementation of a step drive circuit. Other alternatives include a circuit:

without Peltier heat sink H4 if the environmental heat loss is sufficient to cool the section 4, or without heating element RL3 if the environmental heat loss is low enough to maintain the melted section 3, or with a heater and heat sink in each section and circuitry to perform the heating, cooling, and sustaining functions.

Figure 23:
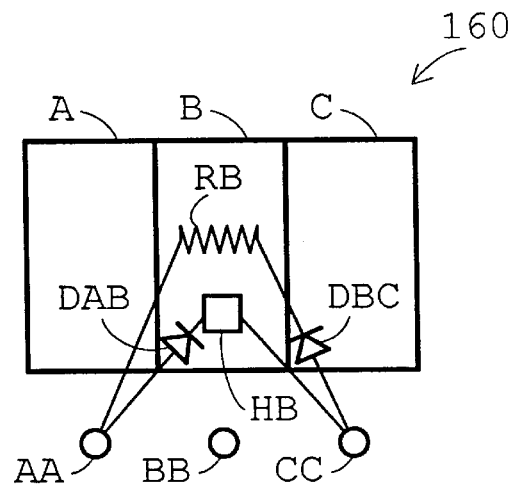
FIG. 23 is a cross sectional schematic view of a symmetric step drive circuit with no heater to maintain the melted state.

The lack of heating elements in the melted zone implies that the environmental heat loss is small enough not to cool down the melted sections before they enter the transition zone. This assumption is more realistic in a space environment, because the engine core's casing may inhibit the intensity of radiative heat loss. If no heater is active within the melted zone, the unit circuit shown in FIG. 23 may be used. The circuit 160 uses a heater RB, a heat sink HB, and two diodes DAB, DBC. Current from transmission bar AA to transmission bar CC will heat section B whereas current in the opposite direction will cool section B. Thus, this circuit will produce reverse motion if the polarity of the input current is reversed.

The fixed geometry of the paraffin rotary engine core 54 within the rotor 40 and stator 42 ensures that all sections cannot contract to their frozen length at the same time.

Consequently, if the paraffin freezes in all chamber sections at any engine position, it will solidify at the cost of the appearance of cavities in all sections not fully contracted. Once frozen, these sections cannot contract even if pressed. For a frozen engine to start (or to restart), therefore, all not fully contracted sections need to be melted first.

The step drive circuit of FIG. 21 is implemented in both forward and reverse directions. Melting of all expanded and partially expanded sections can be achieved by alternately or concurrently driving the paraffin rotary engine 41 in both directions. This requires that heating is slightly more intense then cooling below the paraffin's freezing temperature which is a natural consequence of electrical inefficiency.

In FIG. 13, the momentary phase between two steps of the gear's caterpillar motion is a time span of no length for an ideal structure. It, however, is a finite phase for a real structure. During this phase both circuits for the just finished step and for the step to come are active (the circuit between transmission bars 96b and 96d and that between 96a and 96c). The ambiguity whether which of the two concurrently powered expansion-contraction motion pairs will occur is resolved only by the kinematic restraint of the gear mechanism. If this kinematic restraint proves to be insufficient, it may be reinforced by synchronizing the phases of a number of heat waves 110 as shown in FIG. 7, around the engine core such that at no time will all the waves be in the ambiguous position. For four heat waves 110, this would mean that when two waves, at opposite locations, are in the ambiguous position, the other two are in the middle of a caterpillar step. Note that, in order to ensure a balanced torque on the stator 42 and the rotor 40, a heat wave should always be used with another in the opposite position with the same phase.

Redundancy

Redundancy is often demanded by aerospace applications.

Figure 24:
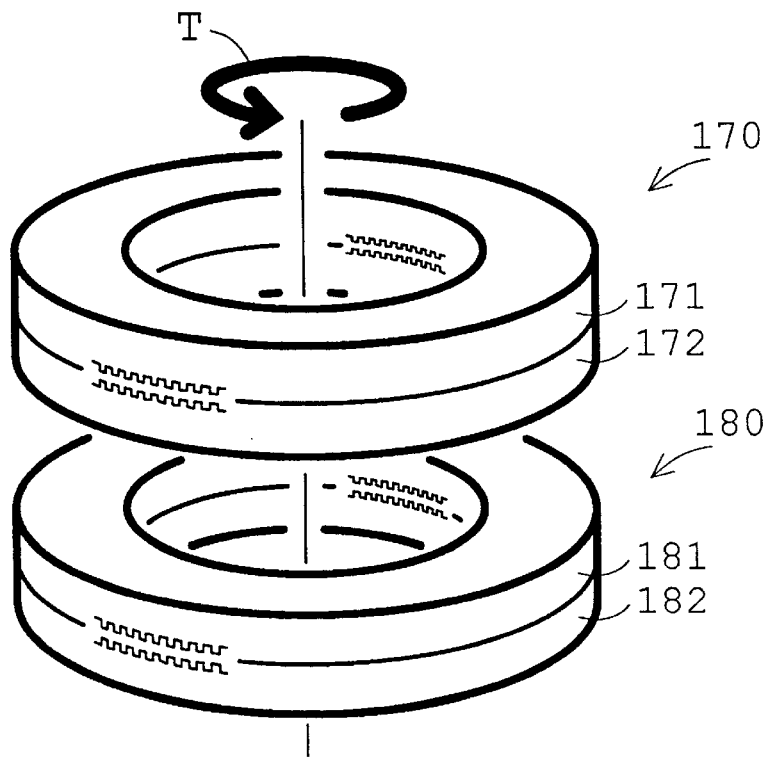
FIG. 24 is a perspective view of a compound engine for the purpose of redundancy.

Although redundancy may easily be provided for its electrical elements, the kinematic structure of the paraffin rotary engine permits no internal mechanical redundancy. By the coupling of two (or a number of motors) however, redundancy can be provided externally. The simplest means for this is illustrated on a two-engine configuration in FIG. 24. Two paraffin rotary engines 170, 180 are attached together at stator 172 and a rotor 181. The output torque T between the stator 182 of a paraffin rotary engine 180 and the rotor 171 of a paraffin rotary engine 170 is that of one paraffin rotary engine 170 or 180. The output rotational velocity is the sum of the two paraffin rotary engines 170, 180. The failure of either paraffin rotary engine 170 or 180 does not disturb the operation of the other. It merely slows down the speed of the output rotation.

Although the present invention has been described with reference to preferred embodiments, numerous modifications and variations can be made and still the result will come within the scope of the invention. No limitation with respect to the specific embodiments disclosed herein is intended or should be inferred.

DESCRIPTION OF AN ALTERNATE EMBODIMENT

Caterpillar Paraffin Rotary Engine Using a Disk to Achieve Electrical Drive

Figure 40:
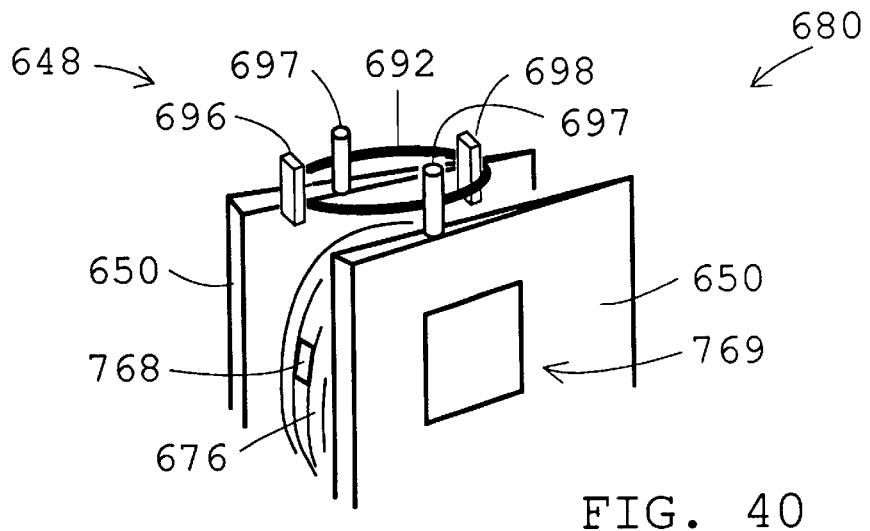
FIG. 40 is a close-up perspective view of the diaphragms and caterpillar gear of a caterpillar rotary engine shown in FIG. 41.
Figure 41:
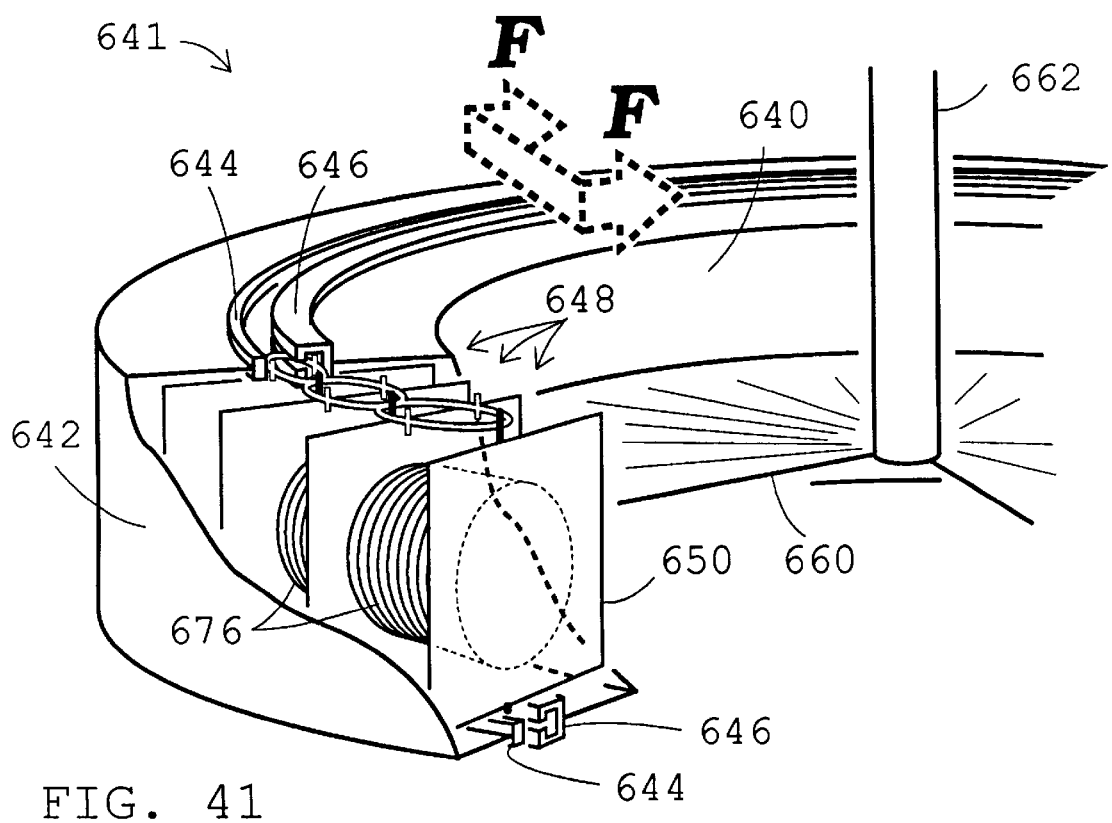
FIG. 41 is a cutaway perspective view of an alternate embodiment of a caterpillar paraffin rotary engine.
Figure 42:
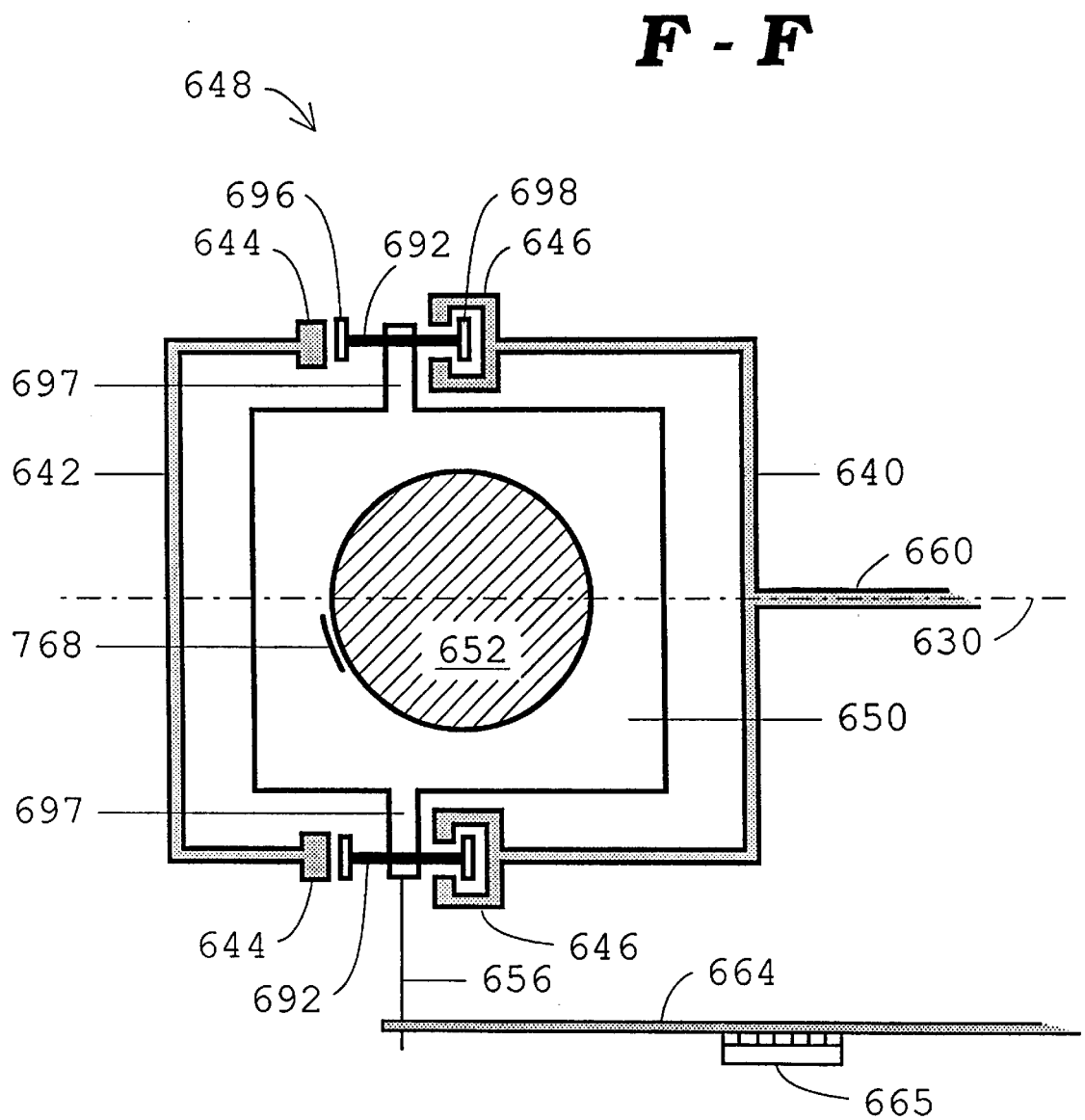
FIG. 42 is a cross-sectional view of the caterpillar paraffin rotary engine taken along line 6—6 of FIG. 41.

The details of an alternate embodiment of the caterpillar paraffin rotary engine 641 are shown in FIGS. 40, 41, and 42. Some aspects of this embodiment can be incorporated in the preferred embodiment and visa versa.

Like the caterpillar paraffin rotary engine 41 shown in FIG. 7, the paraffin rotary engine 641 of FIG. 41 achieves an extremely high output torque by exploiting the expansion of melting paraffin in the direction of actuation. This is accomplished by the use of a paraffin filled chamber 652. The paraffin filled chamber 652 has sections 680 separated by diaphragms 650. The sections 680 are comprised of sealed paraffin-filled metal accordion tubes 676. Attached to the diaphragms 650 on two sides is the caterpillar gear 648. The caterpillar gear 648 operates in the same caterpillar motion as described in FIGS. 13, 14, and 15 for the preferred embodiment, with the following exceptions. The transmission bars 696 and 698 do not necessarily require a gear tooth mechanism. They can act on friction only. The levers 92 and 94 of FIG. 12 have been replaced with a flexible spring 692.

Some of the features of the caterpillar paraffin rotary engine 641 are as follows:

1. The caterpillar paraffin rotary engine 641 has a rotational symmetry about the output shaft 662. Its paraffin filled chamber 652, rotor 640, and stator 642 are also symmetric about a plane perpendicular to the output shaft 662. The number of sections (not shown) is such as to accommodate a multiple of the caterpillar motion mechanism described in preferred embodiment FIGS. 13, 14, and 15 is realized. The caterpillar paraffin rotary engine 641 is also symmetric about a plane 630 perpendicular to the axis of rotational symmetry—the plane which divides the toric chamber 652, between the stator 642 and the rotor 640, into two equal and identical halves.

2. The stator 642 and the rotor 640 are shells that enclose the paraffin-filled chamber 652 and diaphragms 650 within a toric space. The rotor 640, which defines this space from radially inward (from the direction of the axis of engine rotational symmetry), i.e. the axis of the output shaft 662, outputs torque through the output shaft 662—connected to the rotor 640 via the rotor disk 660. The rotor disk 660 may or may not coincide with the engine's 641 plane of symmetry 630.

3. There are two gaps between the stator 642 and rotor 640 shells—one on each planar face of the engine 641 on the top and the bottom. The edges of the stator 642 and the rotor 640 along these gaps form the gear rails 644 and 646. The gear rails 644, 646 are specially shaped surfaces which support and lock to the caterpillar gear 648 that transforms the chamber ring's caterpillar motion to steady rotation. The gear rails 644 and 646 may have gear teeth if the locking of the caterpillar gear mechanism 648 is desired in that way.

4. The gear rails 644 and 646 are the only support for the paraffin-filled chamber 652: The latter is forced to maintain its size and circular shape during actuation by the constraints the gear rails 644 and 646 impose on the caterpillar gear 648. Since actuation involves very high compressive hoop forces within the chamber 652 ring, the rails 644 and 646 are arranged to support the caterpillar gear mechanism 648 radially inward for all transmission bars 696 and 698 that are locked to the rails 644 and 646—whether they are locked to the stator 642 (the enclosed paraffin frozen) or to the rotor 640 (the enclosed paraffin melted). This type of support cannot be achieved with a single gear mechanism 648 alone. Therefore, two gear mechanisms with corresponding transmission bars 696 and 698 are used in the present conceptual design: the transmission bars of one 696 lock into and press upon the stator 642 when the section is contracted, and those of the other 698 suspend outward from the rotor 640 when the section is completely extended. In the example shown, the two transmission bars 696 and 698 are both mounted to the same flexible loop shaped spring 692 on the diaphragms 650, which substitutes for the functionally equivalent four levers of the two gear mechanisms 48 for the section 76 of the preferred embodiment 41. The gear rails 644 and 646 are shaped to fit the just described gear kinematics. The rail 644 and 646 surfaces that support the transmission bars 696 and 698 face toward the engine axis on both the stator 644 and the rotor 640. For the rotor 640 it is required that the rail 646 surfaces be within the two cavities that run around the edges of the rotor 640 shell. The transmission bars 698 of the gear mechanism 648 lock onto the rails symmetrically to eliminate deleterious twisting of the gear mechanism 648.

5. The friction of the transmission bars 696 and 692 with the gear rails' 644 and 646 surfaces is welcome because it further secures transmission bars 696 and 698 in their locked positions.

6. Mounted onto the planar faces of the paraffin rotary engine 641, the gear rails 644 and 646 have a simple planar geometry.

7. Any gear mechanism 648 design, flexural, linkage, temperature-triggered (not shown), etc., may technically be realized.

8. Because there is a radial offset between the rotor and stator gear rails 644 and 646, the expanding sections are necessarily loaded by the gears with an eccentricity. To ensure a uniform sign for this eccentricity, the gear mechanism 648 is radially offset from the centerline of the paraffin-filled chamber ring 652.

9. Adjacent diaphragms 650 subtend angles that vary during operation according to the expansion and contraction of the section of the chamber 652. To minimize the bending of the section 680 of the chamber 652, the diaphragms 650 are slightly wedge-shaped to compensate for the mean value of the angular variations.

10. The energy needed for chamber 652 heating and cooling is minimized via the use of diaphragms 650 with Peltier heat pumps 769. Heat is pumped from the cooling sections to the melting sections. The steady state of the intermediate sections are ensured via sufficient heat conduction through the metal accordion tube 676 wall.

11. Power and control are provided to the chamber 652 ring through flexible connections 656 to some of the gear supports 697 to a dedicated rotating disk 664 freely rotating under the engine 641. The circuitry for temperature control may be mounted on the free surfaces (edges) of the diaphragms 650 as on the preferred embodiment, or logic 665 may be placed outside the engine 641 core on the rotating disk 664 with the necessary connections 656 provided through the rotating disk 664.

During normal forward or backward operation, the logic 665 controls temperature within each individual section 680 according to the phase of engine 641 as sensed through the instantaneous deformations of the sections 680 via strain gauges 768 mounted on the accordion tube 676 walls. The same strain gauges 768 are used to sense the configuration of the engine 641 at start-up, when section heating is provided by logic 665 in all expanded sections 680.

DESCRIPTION OF A SECOND ALTERNATE EMBODIMENT

Squeeze Paraffin Rotary Engine

Figure 25:
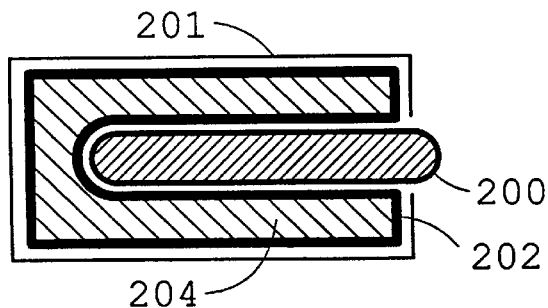
FIG. 25 is a cross-sectional view of the paraffin boot and actuator rod of a paraffin linear actuator with the paraffin in the solid state.
Figure 26:
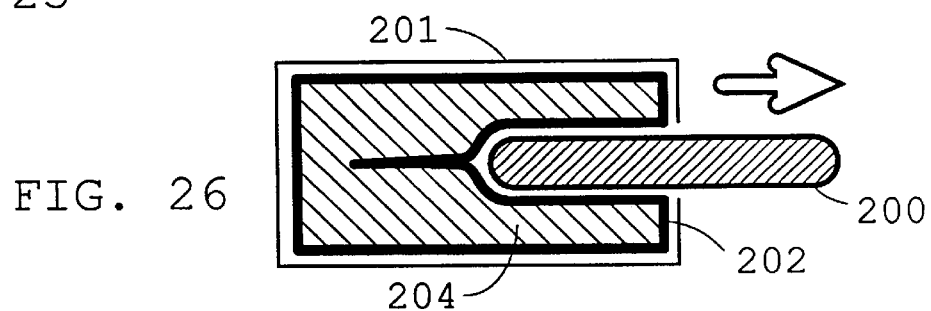
FIG. 26 is a cross-sectional view of the paraffin boot and actuator rod of FIG. 25 with the paraffin in transition to the liquid state.

As previously discussed, the prior art for paraffin actuators have been based on the paradigm of a cylinder filled with an expansive substance. Actuator rods are pushed from the cylinders when the cylinders are heated. FIGS. 25 and 26 depict this concept: an actuator rod 200 is pushed from a cylinder wherein paraffin is contained in a squeeze boot 202. The squeeze boot 202 is filled with paraffin 204. When the temperature of the paraffin 204 is increased to the melting point, the actuator rod 200 is expelled from the cylinder 201.

Figure 27:
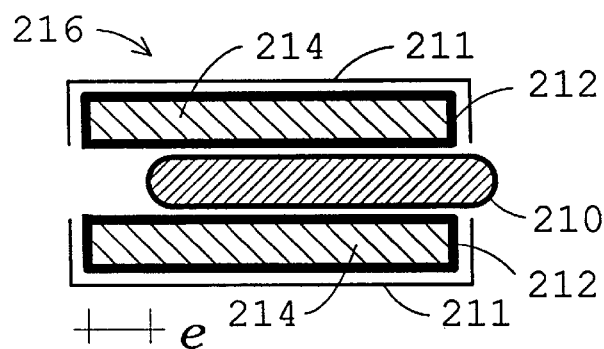
FIG. 27 is a cross-sectional view of a squeeze tube and actuator rod of a paraffin rotary engine with the paraffin in the solid state.
Figure 28:
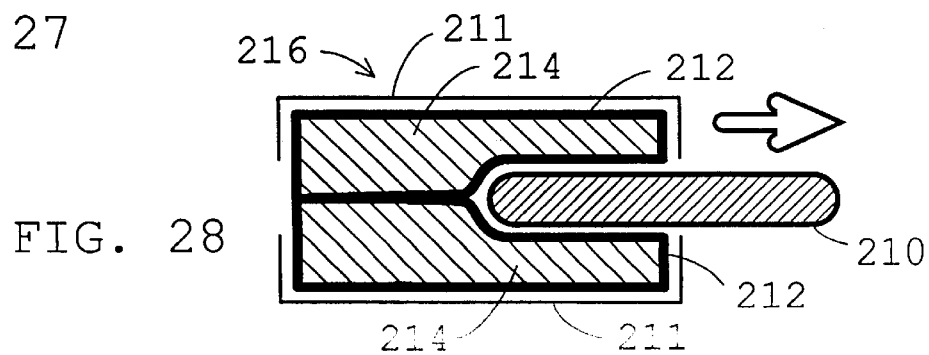
FIG. 28 is a cross-sectional view of a squeeze tube and actuator rod of a paraffin rotary engine with the paraffin partially in the melted state.

FIG. 27 and FIG. 28 is a modification of the concept of FIG. 25 and FIG. 26 where the cylinder 211 is open at both ends and a squeeze tube 212 is used to contain the paraffin 214 that expels an actuator rod 210. As the paraffin 214 melts, it expands expelling the actuator rod 210 like tooth paste from a tube.

Figure 29:
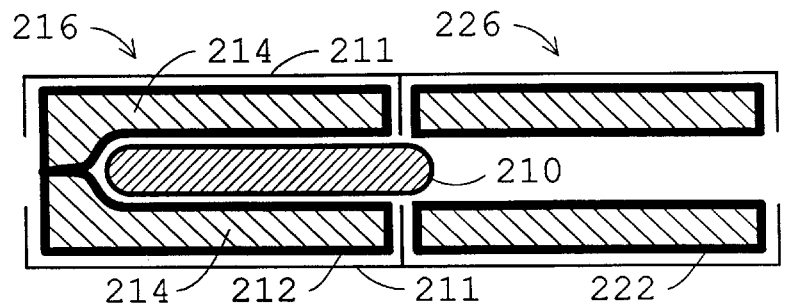
FIG. 29 is a cross-sectional view of two sections of a paraffin rotary engine with the actuator rod moving from the first section to the next one.
Figure 30:
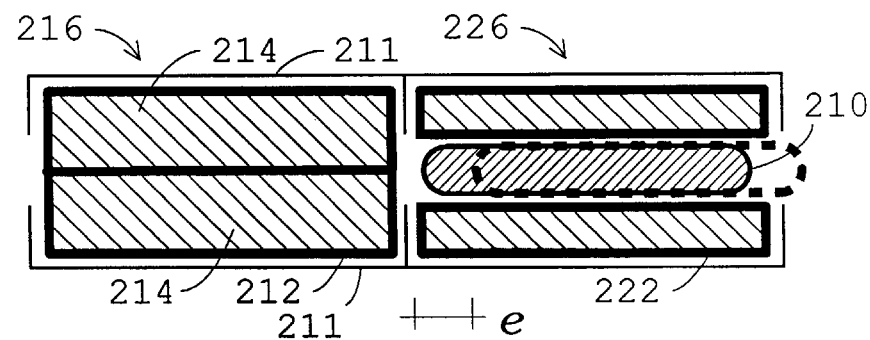
FIG. 30 is a cross-sectional view of two sections of a paraffin rotary engine as shown in FIG. 29. The actuator rod has been passed from one section to the next.

FIGS. 29 and 30 show the section 216 of FIGS. 27 and 28 followed by another like section 226. The actuator rod 210 is passed from squeeze tube 212 to squeeze tube 222. The actuator rod 210 can be expelled from squeeze tube 212 to squeeze tube 222 and so on only if the actuator rod 210 is offset with a distance e from the beginning of squeeze tube 212.

Figure 31:
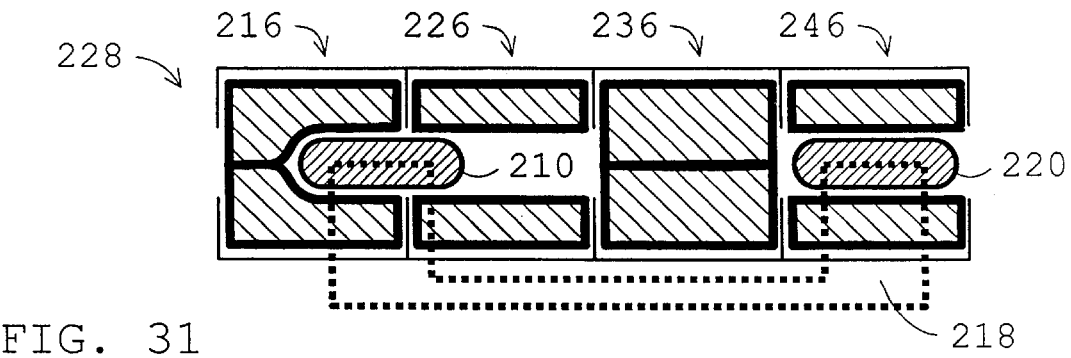
FIG. 31 is a cross-sectional view of four sections and two actuator rods of a paraffin rotary engine. The actuator rods are connected by a coupler.

FIG. 31 is a sequence of squeeze boots and actuator rods with the sections 216, 226 of FIG. 29 and 30 followed by more sections 236, 246. The initial offset e of either actuator rod 210 or 220 can be provided by the other actuator rod via coupler 218. Until the offset e develops for actuator rod 220, the actuator rod 220 is in a passive phase.

While section 246 is in the passive phase, section 216 is pushing actuator rods 210 and 220. This will move actuator rod 220 far enough into section 246 for section 246 to operate in the next phase. In this respect, the linear actuator 228 may be likened to a combustion engine with multiple cylinders.

Figure 32:
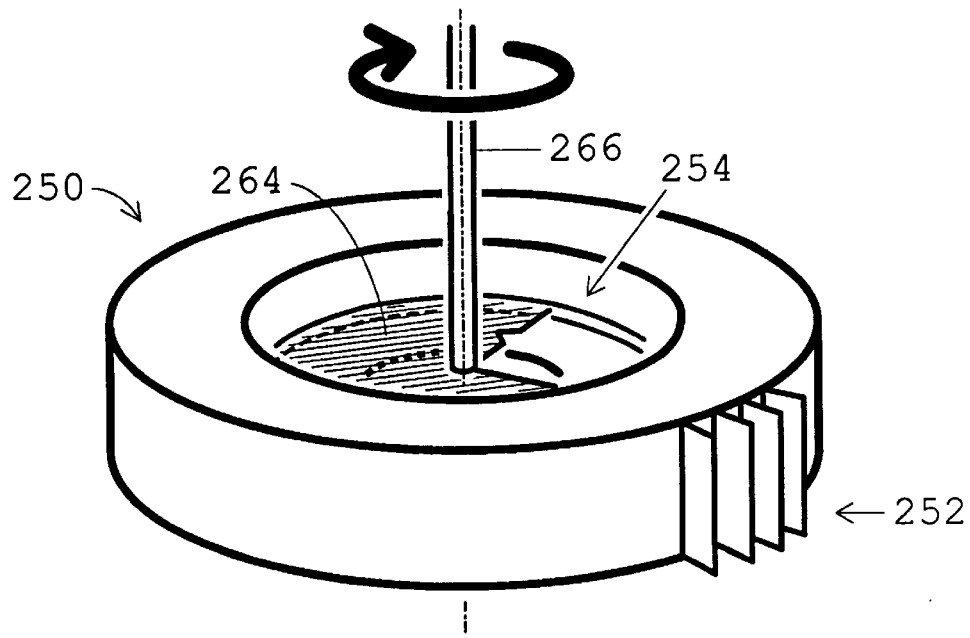
FIG. 32. is a perspective view of a squeeze paraffin rotary engine.
Figure 33:
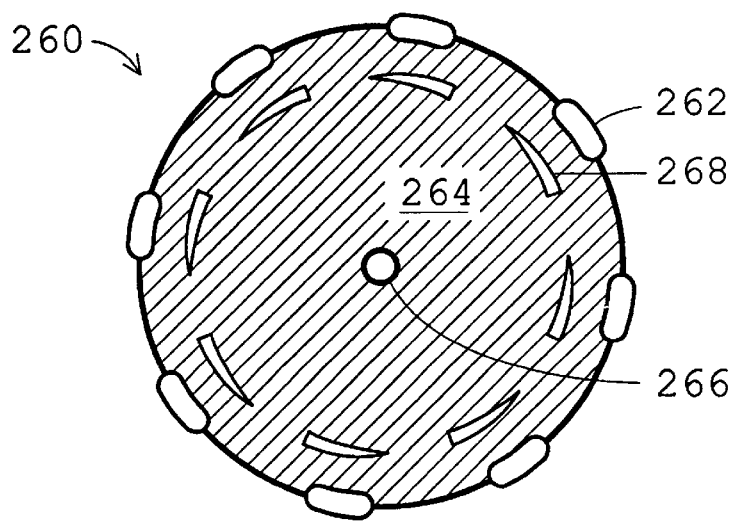
FIG. 33 is a top view of the rotor of the squeeze paraffin rotary engine shown in FIG. 32.

FIG. 32 is a stator 250 for a paraffin rotary engine. The stator 250 has cooling ribs 252 to accelerate the cooling rate of the paraffin (not shown) in the appropriate phase. The stator 250 has a slot 254 to accommodate a rotor disk 260 as shown in FIG. 33. The actuator rods 262 are located along and shaped to fit the circumference of the circular rotor disk 264. The power of the paraffin rotary engine is transmitted via an output shaft 266 mounted in the center of the rotor disk 264. The rotor disk 264 has marks 268 applied to its surface in circumferential repetition. A sensorcontroller 269 is mounted on the stator 250. The sensor/controller 269 sense the position of the marks 268 with respect to the stator 250 to control the heating and cooling of the sequence according to the table below.

FIG. 34 is schematic section of a chamber 256 located inside of the stator 250 of a paraffin rotary engine (not shown). Actuator rods 262 are inside of sections 270 to 274 of the chamber 256; as well as the other sections not numbered on the figure. The following table describes the relationship of temperature versus actuation.

| Section | Temperature | Actuation | Phase |
| --- | --- | --- | --- |
| 270 | rising | active phase | P2 |
| 271 | dropping | none | P4 |
| 272 | cold | none, ready to start | P1 |
| 273 | hot | none, just ended | P3 |
| 274 | dropping | none | P4 |

As a heat wave progresses around a chamber, the sequence of phases for each individual section would be from sections P1 to P2 to P3 to P4.

FIG. 35 and 36 show a cross-sectional view of section 272 (cold) and 273 (hot). The paraffin 275 is contained by a squeeze boot 276 with a slot 277 to allow the rotor disk 264 to pass. The squeeze boot 276 has a circular inner cross-sectional diameter 278 to allow the actuator rods 262 to pass if the paraffin is frozen.

Figure 37:
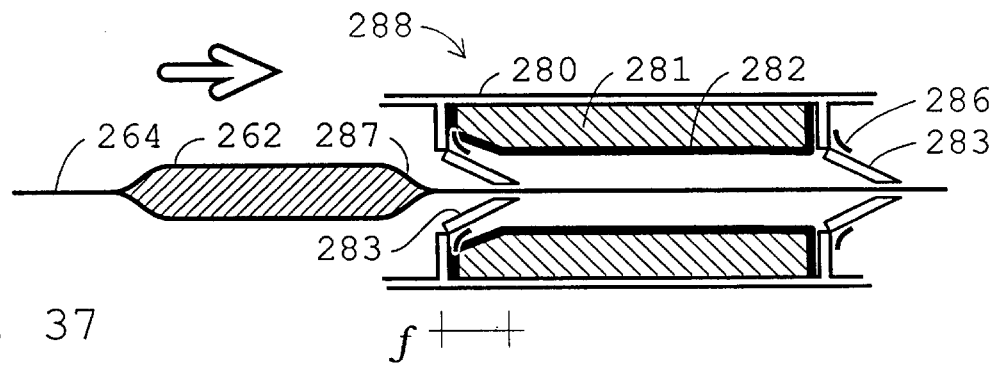
FIG. 37 is a cross-sectional view of a section of a squeeze paraffin rotary engine. This view shows conical doors to restrain the squeeze boots from bulging out of the squeeze tubes in one direction.
Figure 38:
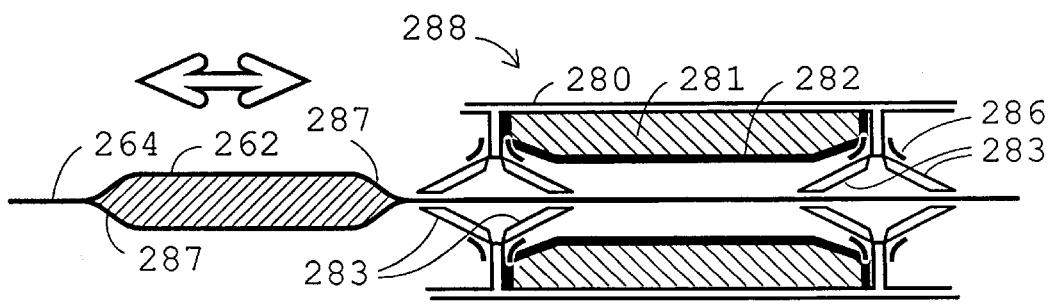
FIG. 38 is a cross-sectional view of a section of a squeeze paraffin rotary engine. This view shows conical doors to restrain the squeeze boots from bulging out of the squeeze tubes in either direction.
Figure 39:
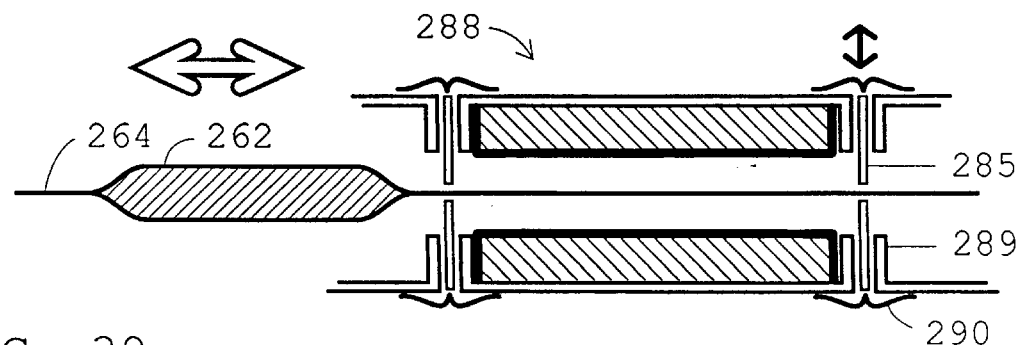
FIG. 39 is a cross-sectional view of a section of a squeeze paraffin rotary engine. This view shows sliding doors which allow passage of the actuator rods in both directions and to restrain the squeeze boots from bulging out of the squeeze tubes in either direction.

To effectively transmit the high reaction forces from the paraffin 275 to the actuator rods 262, the sections must be effectively closed at their ends during actuation phase P2. If the sections were not closed, then the squeeze boot under the high pressure of paraffin would bulge out at the sections 270 and enter the adjacent section 271 rather than squeezing the actuator rod 262 out of the section 270. This effective closure can be achieved by doors that open when the actuator rod 262 needs to pass out of section 270 but close otherwise. FIGS. 37, 38, and 39 are three embodiments of such doors. FIGS. 37, 38, and 39 are a section 288 of chamber 280 of a paraffin rotary engine. The section 288 has a squeeze boot 282 filled with paraffin 281. A rotor disk 264 with actuator rods 262 pass through the section 288. The hole between adjacent sections is closed by pairs of half-cone-shaped doors 283. FIG. 37 is a design for a paraffin rotary engine that rotates in one direction. The half-cone-shaped doors 283 are attached by flexural hinges 286. The shape of the end 287 of the actuator rod 262 pries the door 283 open and slides into the section 288. The doors 283 close behind the actuator rods 262 and their conical shape enables them to well support the expanding paraffin 281.

FIG. 38 is the section 288 of FIG. 37 designed for a paraffin rotary engine that rotates in both directions. If actuation is needed in both directions, the half-cone-shaped doors 283 must be installed in both directions. The doors 283 and the ends 287 of the actuator rods 262 must be designed such that the doors can be opened and not impede the motion of the rods 262. This substantially extends the passive phase length f.

FIG. 39 is an alternative approach to provide doors 285 to the section 288 of FIGS. 37 and 38. This approach does not entail excessive lengths for the passive phase of actuation. Doors 285 slide in slots 289 and are pushed open by the properly designed actuator rods 262. Springs 290 close the doors 285 behind the actuator rods 262. This concept is kinematically simpler than the designs shown in FIGS. 37 and 38 but mechanically more complex.

Common Terminology Used in the Patent

Chamber 52=plurality of sections 70.

Gear mechanism means=members 92, 94, 96; or 692, 696, 697, 698.

Rotor and stator=engine parts for output of power stroke, members 40, 42; or 640, 642; or 250, 264.

Diaphragm=any mechanical element between two adjacent sections including but not limited to planer separator, rods, and the like.

Engine Performance Discussion

Consider an example engine design according to the second embodiment in FIG. 41. Choose the dimensions to produce a small configuration without pushing miniaturization to the extreme: Let the radius of the chamber (the set of all sections) and the diameter of the circular section cross sections be R=1 in and d=0.35 in, respectively. These dimensions yield an approximate cylindrical outer engine envelope of

| | |
|---|---|
| diameter | $D_{eng} \approx 2.6$ in |
| height | $h_{eng} \approx 0.75$ in |
| total volume | $V_{eng} \approx 4$ in$^3$ |

Assume a stainless steel construction (density: $p_s \approx 7.9$ g/CM$^3$), and an average t=0.05 in thickness for the stator and rotor shells, the rotor disk, and the cylindrical engine casing not shown in FIG. 41. With $C_{shells}$, $A_{rot\ disk}$, and $A_{case}$ referring to the cross section circumference of the stator-rotor shell casing, the surface of the rotor disk, and the total surface of the engine casing, respectively, and $V_{shaft}$ denoting the volume of the output shaft, the total mass $m_s$ of these steel parts is thus estimated as $$m_s = p_s t(2R\pi C_{shells} + A_{rot.disk} + A_{case} + p_s V_{shaft})$$
$$= 7.9 * 2.54^3 *.05 * (2*1.0*\pi*(2*.5 + 2*.75) + 75^2 * \pi + (2*1.3^2 * \pi + 2*1.3*\pi*.75)) + 7.9 * 2.54^3 * 0.2$$
$$\approx 250\,g$$

The mass of the chamber (including the diaphragms) and the caterpillar gear are lumped in the chamber's mass via a $P_c \approx 4.0$ g/cm$^3$ assumed section density, which is considerably larger than that of paraffin. The associated mass is $$m_c = p_c(d^2\pi/4)2R\pi = 4.0 * 2.54^3 * 0.0962 * 2 * 1.0 * \pi \approx 40\,g$$

Finally, the electronic parts are accounted for lumped in the rotating electric connection disk, for which a $p_d \approx 6.0$ g/cm$^3$ density and a $t_d=0.02$ in thickness is assumed. The associated mass is $$m_e = p_d(R^2\pi)t_d = 6.0 * 2.54^3 * 1.0 * \pi 0.02 \approx 10\,g$$

The total engine mass is thus
$$m_{eng} = m_s + m_c + m_e \approx 10\,g$$

Further assume that:
- There are two pairs of heat waves (the waves within each pair are placed across the engine and are in phase, put the pairs are out of phase with one another).
- The engine has the minimum number of 20 sections to accommodate the four, alternatively out-of-phase waves (five sections per wave).
- The paraffin is melted at any instant with the same rate as in the IH 50125 linear actuator.
- The total power need of the heat pumps to produce the required rate of melting requires a total of 11 W power. (Note that 10 W at 28 V are required for the IH 50125—the herein assumed 11 W thus corresponds to a very high heat pump efficiency, which is typical to the thermal conditions considered.) Heat pumps for which these data are characteristics are commercially available, e.g., through Melcor Thermoelectrics.
- The deleterious heat produced by the extra 1 W power consumed by the heat pumps can be removed passively (without further energy needed). The total energy consumption of the engine is thus appr. 11 W.

Dimensions and some key parameters

From the above assumptions, as well as from data obtained from *STARSYS RESEARCH* for the IH 50125 linear motor—1.25 in stroke, 50.0 lbf output force, 0.156 in actuator rod diameter, and 105 sec actuation time—number of parameters can be easily derived.

| | |
|---|---|
| paraffin volume increase due to melting | $\alpha = 0.15$ |
| melting rate: time (70 → 80° C.) per melted volume for assumed power consumption | $v_m = 574$ sec/in$^3$ |
| pressure of expanding paraffin | p = 2600 lbf/in$^2$ |
| chamber toric radius | R = 1.00 in |
| section cross section diameter | d = 0.35 in |
| section cross section area | A = d$^2\pi$/4 = 9.962 in$^2$ |
| total volume of chamber | V = 2R$\pi$A = 0.6045 in$^3$ |
| number of sections | $n_c = 20$ |
| number of heat waves | $n_w = 4$ |

Recall that the minimal length of a heat wave is four sections with an invariable total (absolute or angular) length—one section frozen, one melted, and two in transition or, when just completing a caterpillar step, two frozen and two melted sections. Consequently, one obtains the following formulas for additional state description parameters:

| | |
|---|---|
| frozen section angular length | $\gamma_f = 2\pi/(n_c + 2\alpha\,n_w)$ |
| melted section angular length | $\gamma_m = (1 + \alpha)\gamma_f$ |
| angular fraction of chamber melted | $\beta = n_w\,\gamma_m/\pi$ |
| rotation output per engine cycle (per a 2 $\pi$ revolution for every heat wave) | $\delta = 2\,\pi\,\alpha$ |
| melted volume ratio (ratio of total volume of paraff., if melted, to chamber volume) | $\mu = (1 + \alpha - \alpha\,\beta)$ |

For the considered configuration, these formulas yield

| | |
|---|---|
| angular length of a frozen section | $\gamma_f = 0.296$ Rad = 17.0 deg |
| angular length of a melted section | $\gamma_m = 0.341$ Rad = 19.5 deg |
| angular fraction of chamber melted | $\beta = 0.434$ |
| rotation output per engine cycle | $\delta = 0.942$ Rad = 54.0 deg |
| melted paraffin volume to chamber volume ratio | $\mu = 1.085$ |

Power and speed

From the chamber toric radius R, section cross section diameter d, melted paraffin pressure p, and number of heat waves $n_w$, the engine's torque output Q is $$Q = n_w R \frac{d^2 \pi}{4} p \approx 1000\,\text{lbf} - \text{in}$$

Considering that the melted volume of the paraffin is $\mu$ times the chamber volume, and that this volume has to be melted (as well as re-cooled) $n_w$ times for a $\delta$ output rotation (an engine cycle), one obtains the period T for a full 360 deg output rotation as:

$$T = \frac{2\pi}{\delta} v_m \mu V n_w = 10040\,\text{sec} \approx 2.8\,\text{h}$$

The output torque and the period T are scaled with the third power of the engine dimensions. Scaling the considered engine design with 0.5 to the miniature size of an 1.3 in outer diameter and 0.4 in height, thus yields, for the same 11 W power consumption, a 125 lbf—in torque and a 21 min period.

These estimates need to be refined (a) after an analysis of the internal engine forces (such as those experienced by the gear elements and joints) and (b) once the operational details of the electronics (heat pumps, control, etc.) are specified in detail. On the current preliminary level of design, however, the present results provide a fair assessment of engine performance.

Comparison with the state of the art

The performance parameters assessed in the previous section for the example caterpillar engine design are compared with those of some comparable torque output devices that sample the current state of the art in Table 1. The caterpillar engine is lighter and smaller than the conventional actuators with a wide margin.

A similar comparison of the scaled design with medium-power actuators, in Table 2, highlights the same. Note that the rotational velocity of the caterpillar engine is proportional to the input power. Further, engine performance can easily be customized to particular applications.

Since it freezes when left unpowered, the caterpillar engine's "detent" torque is the one that can crush the engine itself—a load clearly higher than the actuation torque. The corresponding stiffness is that rendered by the metal and frozen-paraffin parts of the gear and the chamber. Apparently, this stiffness will also be very high.

| Model | | SCH | MPC | CATa | CATb |
|---|---|---|---|---|---|
| Height | [in] | 4.75 | 9.1 | 0.75 | 0.75 |
| Diameter | [in] | 2.85 | 4.3 | 2.6 | 2.6 |
| Mass | [kg] | 2.0 | ≈2.5 | 0.3 | 0.3 |
| Max. pow. input | [W] | 20 | 73 | 11 | 22 |
| Max. torque | [lbf - in] | 150 | 150 | 125 | 125 |
| Period | [min] | 2.7 | 0.6 | 170 | 85 |

Table 1: Performance and dimensions for some high-torque rotary actuators (SCH: Schaeffer Magnetics, Type 5 rot. act.; MPC: MPC Products Corp., Redundant Servo Actuator; CATa and CATb: caterpillar paraffin rotary engine, example design, for two different input power levels).

| Model | | SCH | HON | CATa | CATb |
|---|---|---|---|---|---|
| Height | [in] | 2.25 | 3.4 | 0.40 | 0.40 |
| Diameter | [in] | 3.25 | 4.0 | 1.3 | 1.3 |
| Mass | [kg] | 0.9 | 2.0 | 0.04 | 0.04 |
| Max. pow. input | [W] | 10 | 14 | 11 | 22 |
| Max. torque | [lbf - in] | 150 | 150 | 125 | 125 |
| Period | [min] | 0.67 | 4.25 | 21 | 10 |

Table 2: Performance and dimensions for some medium-torque rotary actuators (SCH: Schaeffer Magnetics, Type 2 rot. act.; HON: Honeywell Model 1022-1 rot. act.; CATa and CATb: caterpillar paraffin rotary engine, example design scaled to half size, for two different input power levels).

Although the present invention has been described with reference to preferred embodiments, numerous modifications and variations can be made and still the result will come within the scope of the invention. No limitation with respect to the specific embodiments disclosed herein is intended or should be inferred.

I claim:

1. An engine comprising:
   a plurality of serially attached expansive section means each comprising a volume expansion substance functioning to cause a length change along a central axis of the expansive section means upon a heating and a cooling of the high volume expansion substance, and each expansive section having a fully expanded and a fully contracted state and an expanding and a contracting transitional phase therebetween;
   a diaphragm having a location between each serially attached expansive section means;
   a gear mechanism means connecting a front and a rear diaphragm of one member of said plurality of serially attached expansive section means functioning to transfer the length changes of the expansive section means to power strokes;
   a rotor and a stator functioning to translate said power strokes into engine phases; and
   a heating means functioning to synchronously create said length change along the plurality of serially attached expansive section means in a caterpillar motion, thereby resulting in a steady relative motion between the stator and the rotor.

2. The engine of claim 1, wherein said power stroke is a motion parallel to said central axis, and said rotor and said stator each having a gear surface functioning to capture the gear mechanism means of one expansive section during the power stroke of another expansive section.

3. The engine of claim 2, wherein said plurality of serially attached expansive section means further comprise a linear alignment.

4. The engine of claim 2, wherein said plurality of serially attached expansive section means further comprise a closed circular loop configuration.

5. The engine of claim 4, wherein said gear mechanism means further comprises a linkage means functioning to cause a transmission bar to travel perpendicular to the central axis of an expansive section during the expanding and the contracting transitional phases.

6. The engine of claim 5, wherein said transmission bar further comprises a motion parallel to the central axis relative to the rotor during the fully expanded state of a section and relative to the stator during the fully contracted state of the same section.

7. The engine of claim 5, wherein said transmission bar further comprises a motion parallel to the central axis relative to the stator during the fully expanded state of a section and relative to the rotor during the fully contracted state of the same section.

8. The engine of claim 5, wherein the plurality of serially attached expansive section means each further comprises an accordion tube construction.

9. The engine of claim 8, wherein the diaphragms each further comprise a shape extending beyond the accordion tube construction.

10. The engine of claim 9, wherein said diaphragm further comprises an insulating laminae layer and a convective layer, thereby facilitating an individual heating and cooling of the expansive section means.

11. The engine of claim 5, wherein the heating means further comprises a heater in each of said expansive section means powered by a step drive circuit.

12. The engine of claim 11, wherein the step drive circuit further comprises a connection between the heater and the transmission bar and a voltage differential between the rotor and the stator.

13. The engine of claim 12, wherein the heating means further comprises a heat sink powered by a second step drive circuit in each of the expansive section means.

14. The engine of claim 13, wherein the step drive circuit further comprises a diode connected in series with the heater, thereby disabling the step drive circuit during a reverse voltage polarity.

15. The engine of claim 1, wherein the volume expansion substance further comprises paraffin.

16. The engine of claim 1, wherein said heating means further comprises a cold start means functioning to heat a selected group of the plurality of serially attached expansive section means.

17. An engine comprising:

a circular rotor having a location atop a circular stator each having a hollow space and a plurality of curved gear grooves;

said rotor curved gear grooves having a juxtaposed position to said stator gear grooves;

a plurality of serially attached expansive section means having a support means inside said two hollow spaces forming a singular space, and each of said plurality of serially attached expansive section means having a volume expansion substance functioning to cause a length change along a central axis of the expansive section means upon a heating and a cooling of the volume expansion substance;

a diaphragm having a location between each serially attached expansive section means;

said support means further comprising a linkage connecting a pair of diaphragm members located on opposite ends of the expansive section means, and having an intermittent contact with said stator or said rotor;

said linkage further comprising a transmission bar means functioning to move the rotor relative to the stator during the length change via contact with said stator and said rotor curved gear grooves;

a heating means in each of said expansive section means; and a step drive circuit means functioning to synchronously power said heating means, thereby causing the length change and a caterpillar motion along said plurality of serially attached expansive section means and the relative motion between the rotor and the stator.

18. The engine of claim 17, wherein the heating means further comprises a heater in each of said expansive section means powered by a step drive circuit.

19. The engine of claim 18, wherein the heating means further comprises a heat sink powered by a second step drive circuit in each of the expansive section means.

20. The engine of claim 19, wherein the step drive circuit further comprises a diode connected in series with the heater, thereby disabling the step drive circuit during a reverse voltage polarity.

21. The engine of claim 18, wherein the step drive circuit further comprises a connection between the heater and the transmission bar and a voltage differential between the rotor and the stator.

22. The engine of claim 21, wherein the heating means further comprises a cold start means functioning to heat a selected group of the plurality of serially attached expansive section means.

23. The engine of claim 17, wherein the volume expansion substance further comprises paraffin.

24. An engine comprising:

a donut-shaped rotor having a first hollow space facing outbound along a circumference;

a donut-shaped stator having a second hollow space facing inbound along an inner circumference and having a location juxtaposed said first hollow space;

a plurality of serially attached expansive section means having a support means inside said first and second hollow spaces;

said expansive section means each having a volume expansion substance functioning to cause a length change along a central axis of the expansive section means upon a heating and a cooling of the high-volume expansive substance;

a diaphragm having a location between each serially attached expansive section means;

said support means further comprising a spring means connecting a pair of diaphragm members located on opposite ends of the expansive section means functioning to move a transmission bar attached thereto into a propulsive contact with the rotor and the stator upon a length change of the expansive section means;

a heating means in each of said expansive section means;

a circuit means functioning to synchronously power said heating means, thereby causing the length change and a caterpillar motion along said plurality of serially attached expansive section means and a relative motion between the rotor and the stator.

25. The engine of claim 24, wherein the heating means further comprises a heat pump means in the diaphragm functioning to pump heat from one expansive action means to an adjacent expansive section means.

26. The engine of claim 24, wherein the circuit means further comprises a rotating member means functioning to move synchronously with the plurality of serially attached expansive section means and provide a connection between the heating means and the circuit means.

27. A rotary engine comprising:

a rotor disk having an output shaft;

a plurality of actuator rods connected to a periphery of the rotor disk;

a stator encircling the actuator rods;

said stator further comprising a plurality of squeeze boots;

said squeeze boots each further comprising a volume expansive substance means functioning to close a hole in the squeeze boot when heated, thereby propelling an actuator rod located in the hole;

an actuator rod locator means functioning to send a location of an actuator rod to a controller;

a heating means in each squeeze boot functioning to melt the high-volume expansive substance when actuated by the controller; and said controller further comprising a logic means functioning to compute the location of each actuator rod and propel each actuator rod by activating the corresponding squeeze boot.

28. The rotary engine of claim 27, wherein said stator further comprises a plurality of squeeze tubes each housing a squeeze boot, and a door means functioning to prevent said volume expansive substance and squeeze boot from expanding beyond each individual squeeze tube.

29. The rotary engine of claim 27, wherein the heating means further comprises a heater in each of said squeeze boots powered by the controller.

30. The engine of claim 27, wherein the stator further comprises cooling ribs.

* * * * *